(12) United States Patent
Dickey et al.

(10) Patent No.: US 12,320,088 B2
(45) Date of Patent: Jun. 3, 2025

(54) CONNECTION DEVICE FOR FASTENING EXPANDED CELL CONFINEMENT STRUCTURES AND METHODS FOR DOING THE SAME

(71) Applicant: Reynolds Presto Products Inc., Lake Forest, IL (US)

(72) Inventors: Michael James Dickey, Menasha, WI (US); Bryan Scott Wedin, Oneida, WI (US); Cory Scott Schneider, Green Bay, WI (US); Katie Lynn Bouchard, Greenville, WI (US); Joseph Paul George, Manitowoc, WI (US); Jennifer Ann Vander Linden, Appleton, WI (US)

(73) Assignee: Reynolds Presto Products Inc., Lake Forest, IL (US)

( * ) Notice: Subject to any disclaimer, the term of this patent is extended or adjusted under 35 U.S.C. 154(b) by 20 days.

(21) Appl. No.: 18/512,993

(22) Filed: Nov. 17, 2023

(65) Prior Publication Data

US 2024/0084541 A1   Mar. 14, 2024

Related U.S. Application Data

(63) Continuation of application No. 17/364,037, filed on Jun. 30, 2021, now Pat. No. 11,885,091.

(51) Int. Cl.
*E02D 17/20* (2006.01)
*F16B 5/02* (2006.01)
*E02D 29/02* (2006.01)

(52) U.S. Cl.
CPC .............. *E02D 17/202* (2013.01); *F16B 5/02* (2013.01); *E02D 29/0266* (2013.01); *E02D 2600/20* (2013.01)

(58) Field of Classification Search
CPC ... E02D 17/202; E02D 2600/20; F16B 21/02; F16B 15/06
See application file for complete search history.

(56) References Cited

U.S. PATENT DOCUMENTS

| | | |
|---|---|---|
| 1,666,783 A | 4/1928 | Kries |
| 1,900,574 A | 3/1933 | Meader |

(Continued)

FOREIGN PATENT DOCUMENTS

| | | |
|---|---|---|
| CH | 696851 A5 | 12/2007 |
| CN | 209136769 U | 7/2019 |

(Continued)

OTHER PUBLICATIONS

Wells, James C., Results of Direct Shearbox Tests on Performated Geoweb.RTM. Reinforcement with Coarse Sand, Feb. 1993.

(Continued)

*Primary Examiner* — Carib A Oquendo
(74) *Attorney, Agent, or Firm* — Merchant & Gould P.C.

(57) ABSTRACT

A connection device for fastening two expanded cellular confinement structures includes: an insertion member; an integral shank extending perpendicular from the insertion member; and an integral handle member extending perpendicular from the shank at an end of the shank remote from the insertion member. One or more barbs may project from the insertion member. The device can have a washer section between the handle member and insertion member. The handle can be curved, or it can be in the shape of a polygon.

12 Claims, 22 Drawing Sheets

(56) References Cited

U.S. PATENT DOCUMENTS

| | | | |
|---|---|---|---|
| 2,041,335 A | 5/1936 | Hall | |
| 3,568,263 A | 3/1971 | Meehan | |
| 3,848,080 A | 11/1974 | Schmidt | |
| 3,861,527 A | 1/1975 | Perkins | |
| 3,990,131 A | 11/1976 | Okamura | |
| 4,454,875 A | 6/1984 | Pratt et al. | |
| 4,530,622 A | 7/1985 | Mercer | |
| 4,647,325 A | 3/1987 | Bach | |
| 4,681,288 A | 7/1987 | Nakamura | |
| 4,717,283 A | 1/1988 | Bach | |
| 4,778,309 A | 10/1988 | Bach et al. | |
| 4,804,293 A | 2/1989 | Varkonyi et al. | |
| 4,893,978 A | 1/1990 | Frano | |
| 4,965,097 A | 10/1990 | Bach | |
| 5,143,467 A | 9/1992 | Gardner | |
| 5,333,965 A | 8/1994 | Mailey | |
| 5,449,543 A | 9/1995 | Bach et al. | |
| 5,758,987 A | 6/1998 | Frame et al. | |
| 5,927,906 A | 7/1999 | Bach et al. | |
| 6,395,372 B1 | 5/2002 | Bach | |
| 6,554,545 B1 | 4/2003 | Hall | |
| 6,612,525 B2 * | 9/2003 | Bagdi | H05K 3/301 248/74.1 |
| 6,745,662 B2 | 6/2004 | Ford | |
| D492,575 S | 7/2004 | Carroll et al. | |
| 7,179,013 B2 | 2/2007 | Benedetti | |
| 7,373,860 B1 | 5/2008 | Rinner | |
| 7,993,080 B2 | 8/2011 | Erez et al. | |
| 8,092,122 B2 * | 1/2012 | Senf | E02D 17/202 24/458 |
| 8,092,896 B2 | 1/2012 | Erez et al. | |
| 8,459,903 B2 | 6/2013 | Senf et al. | |
| 8,616,091 B2 | 12/2013 | Anderson | |
| 8,827,597 B2 | 9/2014 | Bach et al. | |
| 9,080,587 B1 | 7/2015 | Smith | |
| 10,731,303 B2 | 8/2020 | Lingle et al. | |
| 2005/0069387 A1 | 3/2005 | Arollanes | |
| 2006/0193694 A1 | 8/2006 | Lee | |
| 2008/0213521 A1 | 9/2008 | Halahmi et al. | |
| 2009/0151136 A1 | 6/2009 | Ramsauer | |
| 2009/0199372 A1 | 8/2009 | Anderson | |
| 2009/0324346 A1 | 12/2009 | Milton et al. | |
| 2010/0252702 A1 | 10/2010 | Spang, Jr. et al. | |
| 2011/0217117 A1 | 9/2011 | Halahmi et al. | |
| 2020/0284074 A1 | 9/2020 | Zhang et al. | |

FOREIGN PATENT DOCUMENTS

| | | |
|---|---|---|
| DE | 102019109211 A1 | 10/2020 |
| GB | 2476055 A | 6/2011 |
| JP | 49105899 U | 9/1974 |
| JP | 56016730 A | 2/1981 |
| JP | 56113214 U | 9/1981 |
| JP | 57003923 A | 1/1982 |
| JP | 58101932 A | 6/1983 |
| JP | 58106020 A | 6/1983 |
| JP | 58109103 U | 7/1983 |
| JP | 58131228 A | 8/1983 |
| JP | 61010630 A | 1/1986 |
| JP | 63151712 A | 6/1988 |
| JP | 2013011106 A | 1/2013 |
| JP | 5684866 B2 | 3/2015 |
| JP | 5719700 B2 | 5/2015 |
| KR | 101829418 B1 | 2/2018 |
| KR | 101873313 B1 | 8/2018 |
| WO | 2017078551 A1 | 5/2017 |

OTHER PUBLICATIONS

Wells, James C., Results of Large-Scale Shearbox Tests of Perforrnated Geoweb.RTM. Reinforcement with Crushed Limestone, Mar. 1993.
Invitation to Pay Additional Fees with Partial International Search mailed Apr. 7, 2010.
International Search Report and Written Opinion mailed Jun. 10, 2010.
Invitation to Pay Additional Fees for PCT Application No. PCT/US2022/031273, dated Aug. 19, 2022, 12 pages.
International Search Report and Written Opinion for PCT Application No. PCT/US2022/031273, dated Nov. 2, 2022, 14 pages.

* cited by examiner ative in many connection devices to provide a relatively weak structural connection

CONNECTION DEVICE FOR FASTENING EXPANDED CELL CONFINEMENT STRUCTURES AND METHODS FOR DOING THE SAME

CROSS-REFERENCE TO RELATED APPLICATIONS

This application is a continuation of U.S. patent application Ser. No. 17/364,037, filed Jun. 30, 2021, the disclosure of which is hereby incorporated by reference herein in its entirety.

TECHNICAL FIELD

This disclosure relates to connection devices for expanded cellular confinement structures for the confinement of infill material. In particular, this disclosure relates to improved connectors having barbs and methods used for fastening together at least two expanded cellular confinement structures.

BACKGROUND

A cellular confinement structure serves to increase the load bearing capacity, stability, and erosion resistance of infill materials which are placed within the cells of the system. A commercially available system is Geoweb® plastic web confinement structure sold by Reynolds Presto Products, Inc., Appleton, Wisconsin. Geoweb® cells are made from high density polyethylene strips that are joined by welds on their faces in a side-by-side relationship at alternating spaces so that when the strips are stretched out in a direction perpendicular to the faces of the strips, the resulting web section is honeycomb-like in appearance, with sinusoidal or undulated-shaped cells. Geoweb® sections are lightweight and are shipped in their collapsed form for ease in handling and installation. Geoweb® systems have been described in U.S. Pat. Nos. 6,395,372; 4,778,309; 4,965,097; and 5,449,543, each of these patents being incorporated by reference herein.

The cellular confinement structures are typically arranged adjacent to each other and then connected together. In the past, these sections have been connected together by using staples, wires, cable ties, etc. These devices are labor-intensive and consume excessive construction time. In many implementations, these types of connections are difficult to use because of the particular situation or terrain. Most often, these types of connection systems require power from generators and air actuation from compressors. The requirement for power can add to the difficulty, given the particular environment or terrain that such cellular confinement systems are typically placed. The unit cost per connection can be quite high on smaller projects as the fixed costs for supply of generators and air compressors are similar to a small installation as would be required for a large installation. Moreover, some of these connection devices provide relatively weak structural connections and are non-durable. In some implementations, these are not problems. In many applications, however, speed is important and the availability of power equipment is challenging.

Reynolds Presto Products developed a connection device for cellular confinement structures, described ins U.S. Pat. No. 8,092,122, incorporated herein by reference. While this connection device solves many of the problems outlined above, improvements are desirable.

SUMMARY OF THE DISCLOSURE

In one aspect, a connection device for fastening two expanded cellular confinement structures is provided. The connection device includes: an insertion member having first and second opposite insertion ends and an insertion member extension therebetween; an integral shank extending generally perpendicular from the insertion member extension and being spaced from each of the first and second insertion ends; an integral handle member extending generally perpendicular from the shank at an end of the shank remote from the insertion member; the handle member having first and second handle ends and a handle member extension therebetween; the shank being spaced from each of the first and second handle ends; and a plurality of barbs projecting from the insertion member.

In many examples, the plurality of barbs project from the insertion member toward the handle member.

The insertion member extension includes, in many embodiments, an external face facing away from a remaining portion of the connection device; an internal face facing toward the handle member; and the plurality of barbs project from the internal face of the insertion member extension toward the handle member.

In many example embodiments, the shank intersects the internal face; and the plurality of barbs includes at least one barb projecting from the internal face on opposite sides of the insertion member extension.

In one or more embodiments, the plurality of barbs includes at least two barbs projecting from the internal face on opposite sides of the insertion member extension.

In many examples, the first and second insertion ends join the external face and internal face.

In example embodiments, the first insertion end has a planar first end face; and the second insertion end has a planar second end face.

Some implementations include the external face having a first angled section; a second angled section; and a straight mid-section extending between the first angled section and second angled section; the first angled section extending from the first insertion end to the mid-section at a non-zero angle; and the second angled section extending from the second insertion end to the mid-section at a non-zero angle.

In example embodiments, the internal face has a first portion and a second portion; the first portion being between the first insertion end and the shank; the second portion being between the second insertion end and the shank; the plurality of barbs includes at least one barb extending from the first portion toward the handle member; and the plurality of barbs includes at least one barb extending from the second portion toward the handle member.

In many embodiments, the plurality of barbs includes at least two barbs extending from the first portion toward the handle member; and the plurality of barbs includes at least two barbs extending from the second portion toward the handle member.

Example embodiments can include a first of the barbs on the first portion is adjacent the first insertion end; and a first of the barbs on the second portion is adjacent the second insertion end.

In some examples, the first portion is a straight extension between the shank and the first insertion end; and the second portion is a straight extension between the shank and the second insertion end.

One or more embodiments may have the first portion includes a first straight section extending from the shank; and a first beveled section being angled away from the first straight section downward to the first insertion end at a non-zero angle; and the second portion includes a second straight section extending from the shank; and a second beveled section being angled away from the second straight section downward to the second insertion end at a non-zero angle.

In some implementations, a first of the barbs on the first portion is adjacent the first insertion end; and a second of the barbs on the first portion is between the first straight section and the first beveled section; and a first of the barbs on the second portion is adjacent the second insertion end; and a second of the barbs on the second portion is between the second straight section and the second beveled section.

Many examples include the shank having a shank length between the insertion member and the handle member; the shank length being greater than a length of the first straight section and second straight section.

In some examples, the shank length is less than half of a length of the handle member and the insertion member.

Many examples included a largest distance between the internal face and external face of the insertion member extension is at least 5 times a height of the barbs.

In one or more embodiments, the handle member, insertion member, and shank are a solid piece.

In one or more embodiments, the handle member extension includes first and second rounded ears projecting therefrom.

In one or more embodiments, the first and second ears are projecting away from the insertion member at the first and second handle ends, and the handle member extension is straight between the first and second ears.

In example embodiments, the connection device has a longitudinal axis bisecting the device extending through each of the insertion member, handle member, and shank; and each barb in the plurality of barbs has at least one beveled surface ending with an end point.

In one or more embodiments, each beveled surface of the barbs extends along a plane that intersects the longitudinal axis.

Many implementations include each beveled surface of the barbs extending along a plane that intersects the longitudinal axis at: the shank, the handle member, or in space above the handle member and away from the insertion member, when the connection device is oriented with the handle member upright and the insertion member lowermost.

In example embodiments, the connection device is symmetrical about the longitudinal axis.

In another aspect, a cellular confinement system is provided comprising: a first unitary web of cells made from elongated plastic strips bonded together in spaced apart areas; the strips forming walls of the cells; at least some of the cells defining open slots; a second unitary web of cells made from elongated plastic strips bonded together in spaced apart areas; the strips forming walls of the cells; at least some of the cells defining open slots; at least one open slot of the first unitary web of cells being aligned with at least one open slot of the second unitary web of cells to result in a cell overlap region; the cell overlap region having opposite first and second sides; and at least one connection device fastening the first unitary web of cells and the second unitary web of cells together; the connection device including: an insertion member having first and second opposite insertion ends and an insertion member extension therebetween; the insertion member being located on the second side of the cell overlap region; a plurality of barbs projecting from the insertion member toward the first side of the cell overlap region; an integral shank extending generally perpendicular from the insertion member extension and being spaced from each of the first and second insertion ends; the shank extending through the cell overlap region by extending through both of the aligned one open slot of the first unitary web of cells and the one open slot of the second unitary web of cells; an integral handle member extending generally perpendicular from the shank at an end of the shank remote from the insertion member; the handle member having first and second handle ends and a handle member extension therebetween; the shank being spaced from each of the first and second handle ends; and the handle member being located the first side of the cell overlap region.

In one or more embodiments, the at least one connection device includes a plurality of connection devices, each connection device fastening the first unitary web of cells and the second unitary web of cells together.

In many example embodiments, the insertion member extension includes: an external face facing away from a remaining portion of the connection device; an internal face facing toward the handle member; and wherein the plurality of barbs project from the internal face of the insertion member extension toward the handle member.

Example embodiments can include the internal face having a first portion and a second portion; the first portion being between the first insertion end and the shank; the second portion being between the second insertion end and the shank; the plurality of barbs includes at least one barb extending from the first portion toward the handle member; and the plurality of barbs includes at least one barb extending from the second portion toward the handle member.

In another aspect, a method of fastening two expanded cellular confinement structures together is provided. The method includes: aligning two expanded cell confinement structures so that at least one open slot defined by a first unitary web of cells is aligned with at least one open slot defined by a second unitary web of cells to form an overlap region having opposite first and second sides; inserting an insertion member of a connection device from the first side of the overlap region through the aligned open slots of the overlap region to provide: the insertion member on the second side of the overlap region with a plurality of barbs projecting from the insertion member toward the first side of the overlap region; a handle member of the connection device on the first side of the overlap region; and a shank between the insert member and the handle member extending through the overlap region; and rotating the handle member to rotate the connection device within the overlap region.

The step of rotating can include rotating the handle member approximately 90°.

In another aspect, a kit is provided. The kit includes: a plurality of unitary webs of cells made from elongated plastic strips bonded together in spaced apart areas; the strips forming walls of the cells; at least some of the cells defining open slots that are alignable with open slots of adjacently positioned unitary webs of cells at cell overlap regions, the cell overlap regions having opposite first sides and second sides; and a plurality of connection devices usable to fasten together adjacently positioned unitary webs of cells through the slots at the cell overlap regions; each of the connection devices including: an insertion member having first and second opposite insertion ends and an insertion member extension therebetween; the insertion member being positionable on the second side of the cell overlap region; a plurality of barbs projecting from the insertion member and being positionable toward the first side of the cell overlap region; an integral shank extending generally perpendicular from the insertion member extension and being spaced from each of the first and second insertion ends; the shank being positionable through the cell overlap region by extending through aligned slots; and an integral handle member extending generally perpendicular from the shank at an end of the shank remote from the insertion member; the handle member having first and second handle ends and a handle member extension therebetween; the shank being spaced from each of the first and second handle ends; and the handle member being positionable on the first side of the cell overlap region.

DETAILED DESCRIPTION

Figure 1:
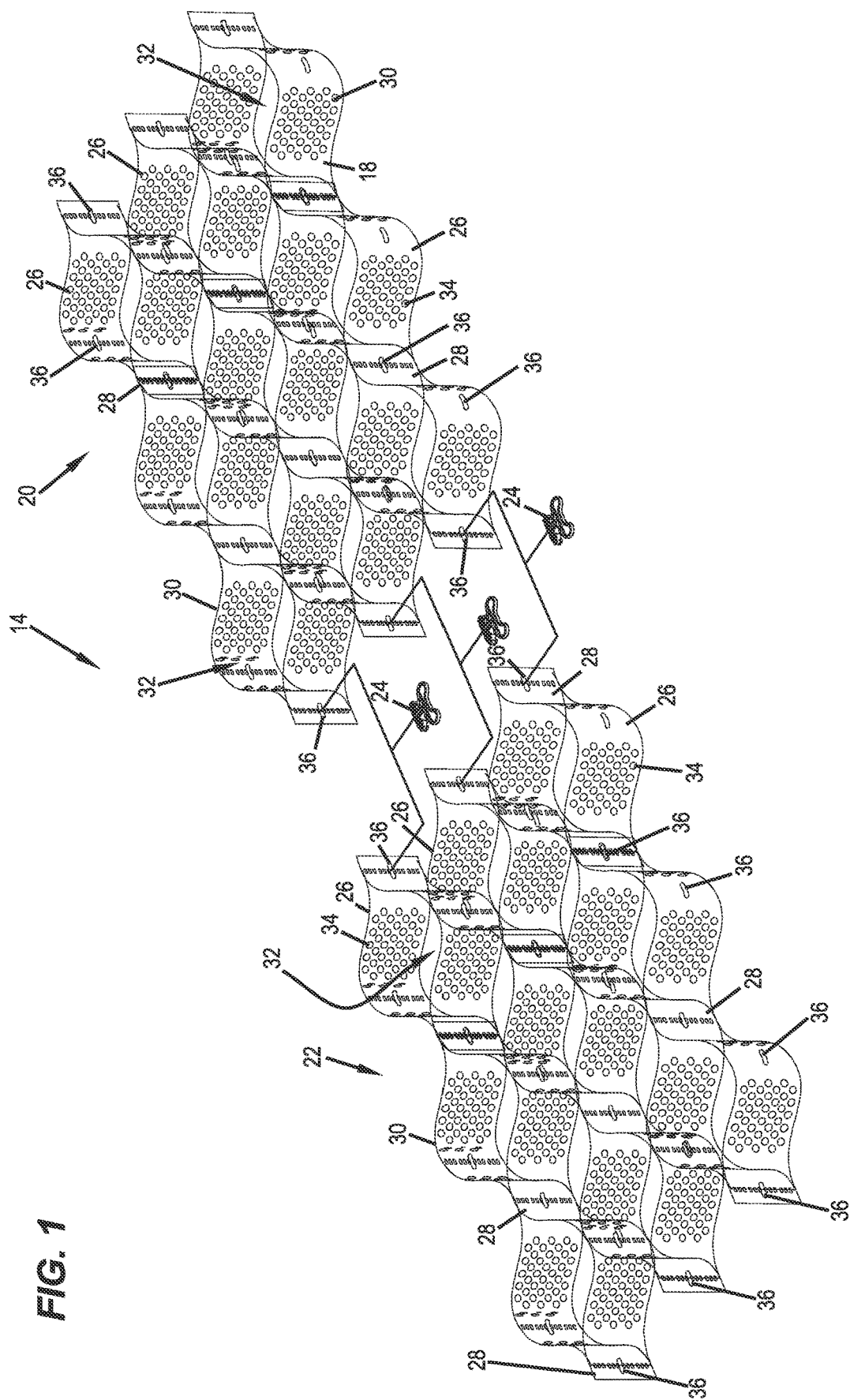
FIG. 1 is a schematic, exploded perspective view of a cellular confinement system and connection devices, prior to assembly end-to end, utilizing principles in accordance with this disclosure.
Figure 1A:
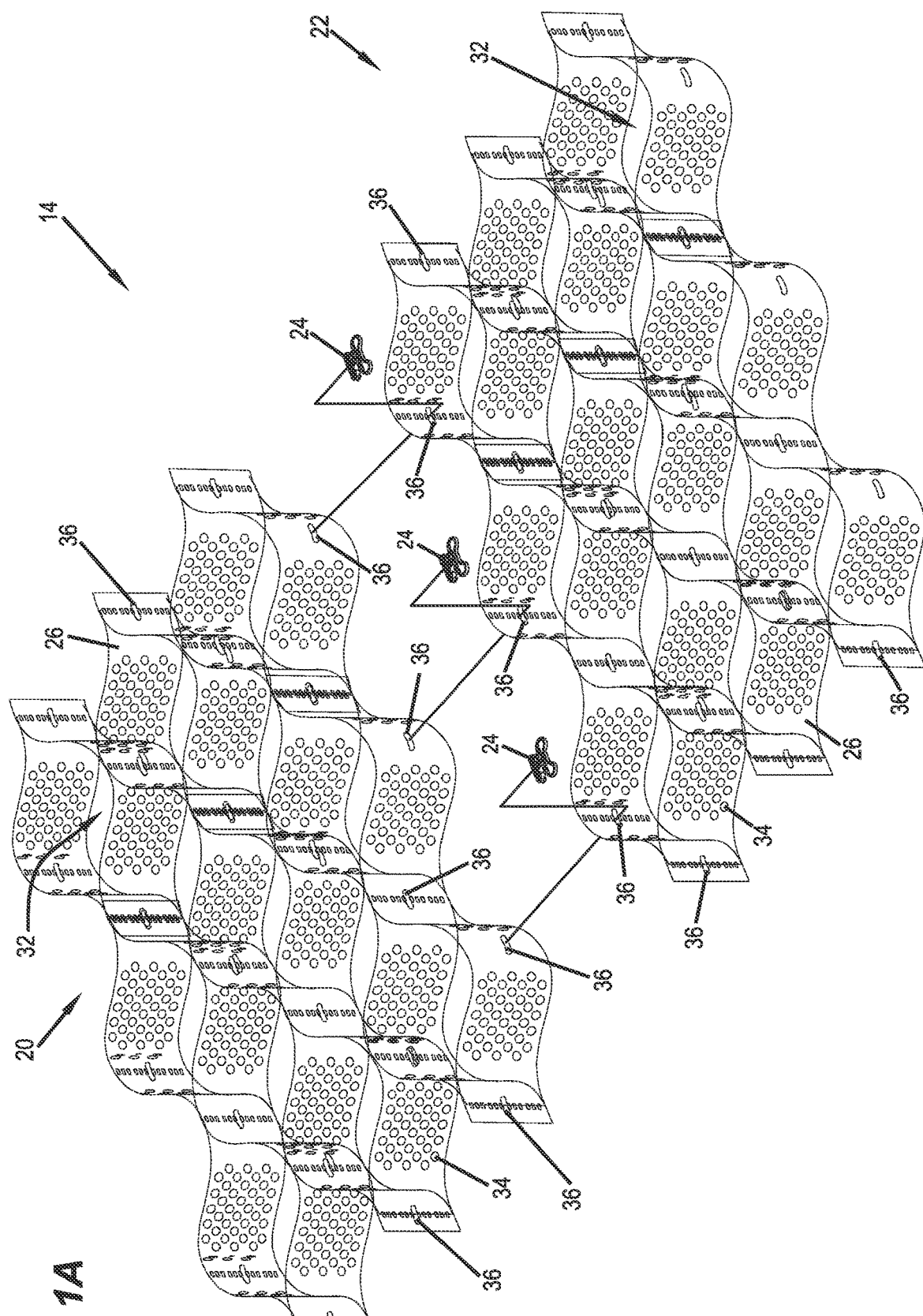
FIG. 1A is a schematic, exploded perspective view of a cellular confinement system and connection devices, prior to lateral assembly, utilizing principles in accordance with this disclosure.

In FIGS. 1 and 1A, there is depicted a cellular confinement system 14. In the particular implementation shown, the cellular confinement system 14 includes first and second unitary webs of cells. The first web of cells is shown at 20, while the second web of cells is shown at 22. In the embodiment shown, the cellular confinement system 14 further includes at least one connection device 24 for fastening together the first web 20 and second web 22.

FIG. 1 shows the system 14 before the first and second webs 20, 22 are connected together in an end-to-end manner. FIG. 1A shows the system 14 before the first and second webs 20, 22 are connected together side-by-side (laterally). Each of the expanded cellular confinement structures 18 has a plurality of strips of plastic 26 that are bonded together, one strip to the next at alternating and equally spaced bonding areas 28 to form cell walls 30 of individual cells 32. When the plurality of strips 26 are stretched in a direction perpendicular to the face of the strips, the strips 26 bend in a sinusoidal manner and form webs 20, 22 of cells 32 in a repeating cell pattern. Each cell 32 has a cell wall 30 that is made up from one strip 26 and a cell wall 30 made from a different strip 26.

In this embodiment, the strips 26 define apertures 34. The apertures 34 can be used to accommodate tendons to reinforce the webs 20, 22 and improve the stability of web installations by acting as continuous, integral anchoring members to prevent unwanted displacement of the webs 20, 22. The apertures 34 also help to allow for aggregate interlock while maintaining sufficient wall stiffness for construction site infilling. Optimized aperture sizes and patterns are described in U.S. Pat. No. 6,395,372, incorporated by reference herein.

Figure 2:
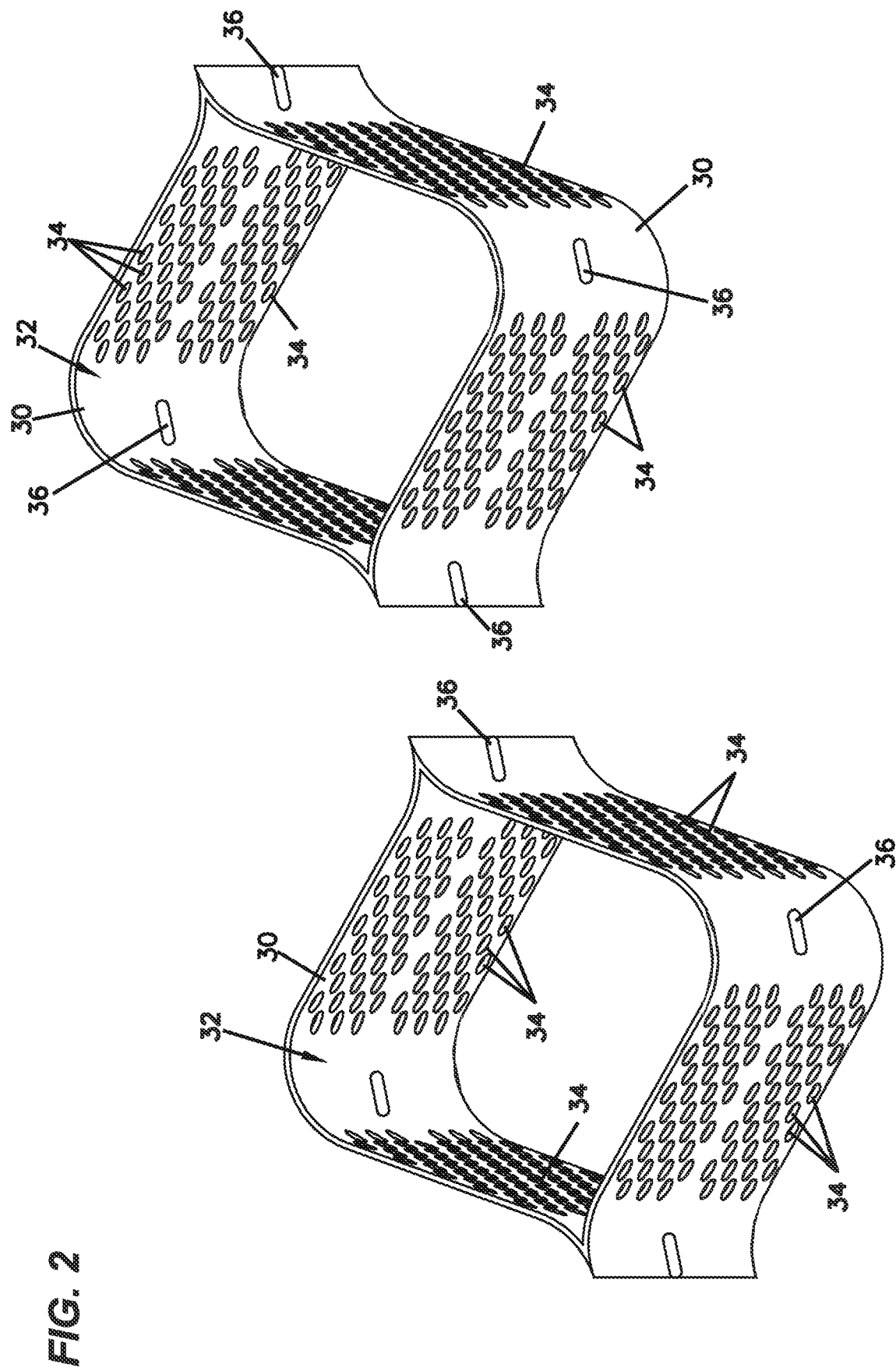
FIG. 2 is a perspective view of two cells that are part of an expanded cellular confinement structure prior to being connected together.

FIG. 2 shows two cells 32. The cells 32 in FIG. 2 differ somewhat from the depiction in FIG. 1, in that the strips 26 do not contain all of the apertures 34 as depicted in FIG. 1. The apertures 34 can be used optionally, depending upon the implementation. FIG. 2 depicts open slots 36 defined by the cell walls 30 in the strips 26. The slots 36 are utilized to cooperate with connection device 24 in order to fasten together adjacent webs 20, 22.

Figure 3:
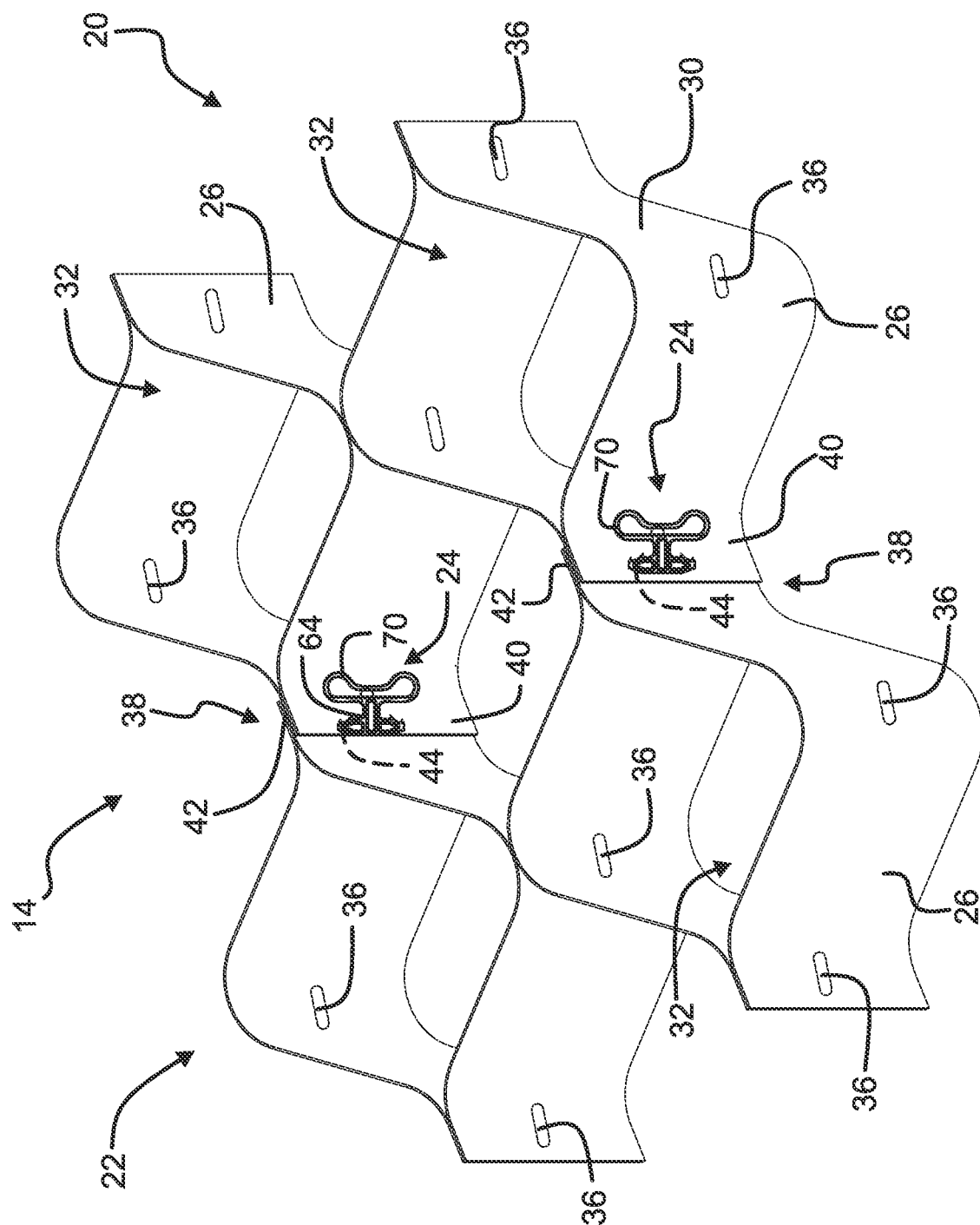
FIG. 3 is a perspective view of two expanded cellular confinement structures connected together utilizing connection devices constructed in accordance with principles of this disclosure.

FIG. 3 shows the cellular confinement system 14 with the first web 20 and the second web 22 fastened together by connection device 24. In the embodiment of FIG. 3, at least one connection device 24 is used, and as shown, a plurality of connection devices 24 is used. FIG. 3 shows specifically two connection devices 24. The apertures 34 are omitted in FIG. 3 for purposes of clarity.

Still in reference to FIG. 3, a cell overlap region 38 is depicted. In particular, there are two cell overlap regions 38 depicted. The cell overlap region, as shown, includes an open slot 36 of the first unitary web of cells 20 aligned with open slot 36 of the second unitary web of cells 22. The cell overlap region 38 defines a first side 40 and an opposite second side 42. The connection device 24 can be seen penetrating or passing through the overlap region 38 with part of the connection device 24 on the first side of the overlap region 38, while another portion of the connection device 24 can be seen in phantom on the second side 42 of the overlap region 38. An example of this will be described further below.

Attention is directed to FIGS. 4-8. FIGS. 4-8 depict one example embodiment of connection device 24. In the embodiment depicted, the connection device 24 includes an insertion member 44. The insertion member 44 has first and second opposite insertion ends 46, 47 and an insertion member extension 48 between the first insertion member end 46 and second insertion member end 47. A first length is defined by the distance between the first insertion member end 46 and second insertion member end 47.

The insertion member extension 48 includes an external face 54 facing away from a remaining portion of the connection device 24. While many embodiments are possible, in the one shown, the external face 54 has a straight and generally planar mid-section 55, generally centered on a shank 64. The external face 54 further includes a first angled section 56, and a second angled section 57. The mid-section 55 extends between the first angle section 56 and second angled section 57. The first angled section 56 extends from the first insertion end 46 to the mid-section 55 at a non-zero angle α (FIG. 6), which can be 60° or less; 45° or less; 30° or less; for example 15-25°, or about 20°. The second angled section 57 extends from the second insertion end 47 to the mid-section 55 at a non-zero angle β (FIG. 6), which can be 60° or less; 45° or less; 30° or less; for example 15-25°, or about 20°. In preferred arrangements, the angle of the first angled section 56 and second angled section 57 are the same.

Figure 5:
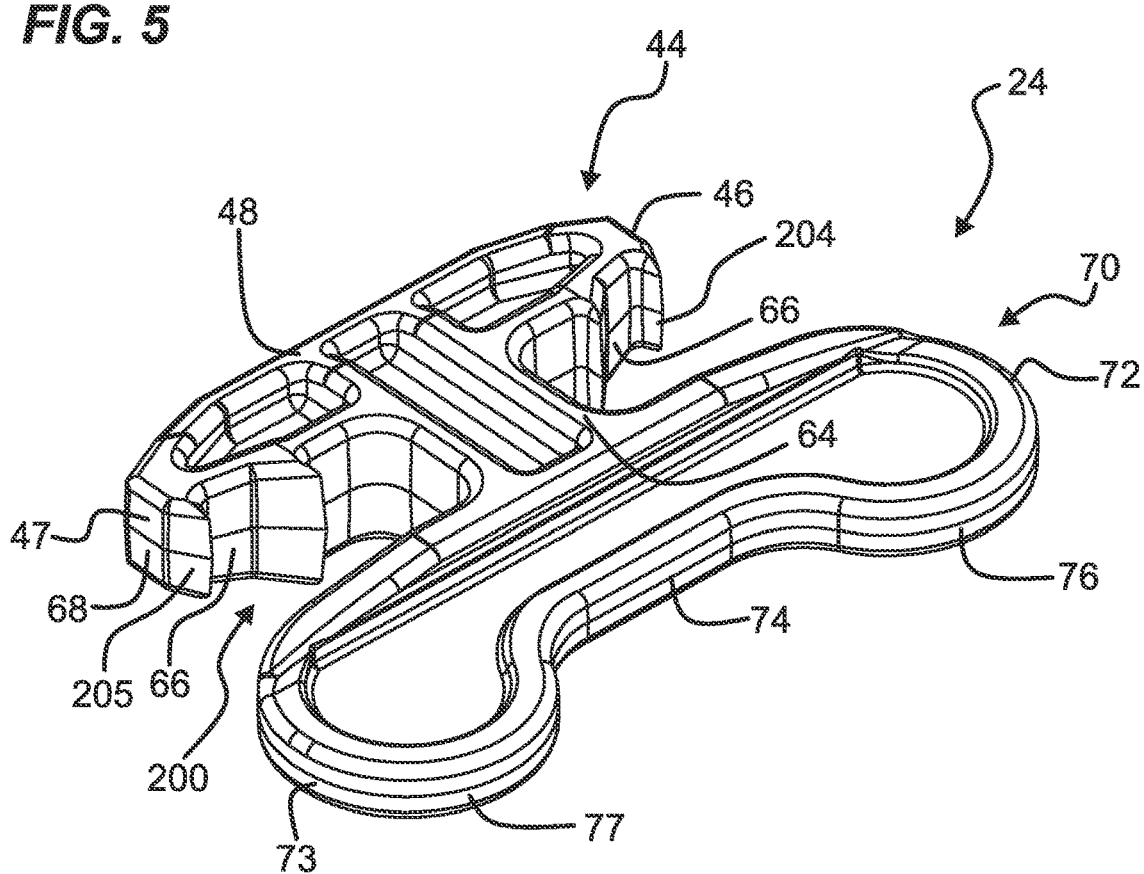
FIG. 5 is another perspective view of the connection device of FIG. 4.
Figure 6:
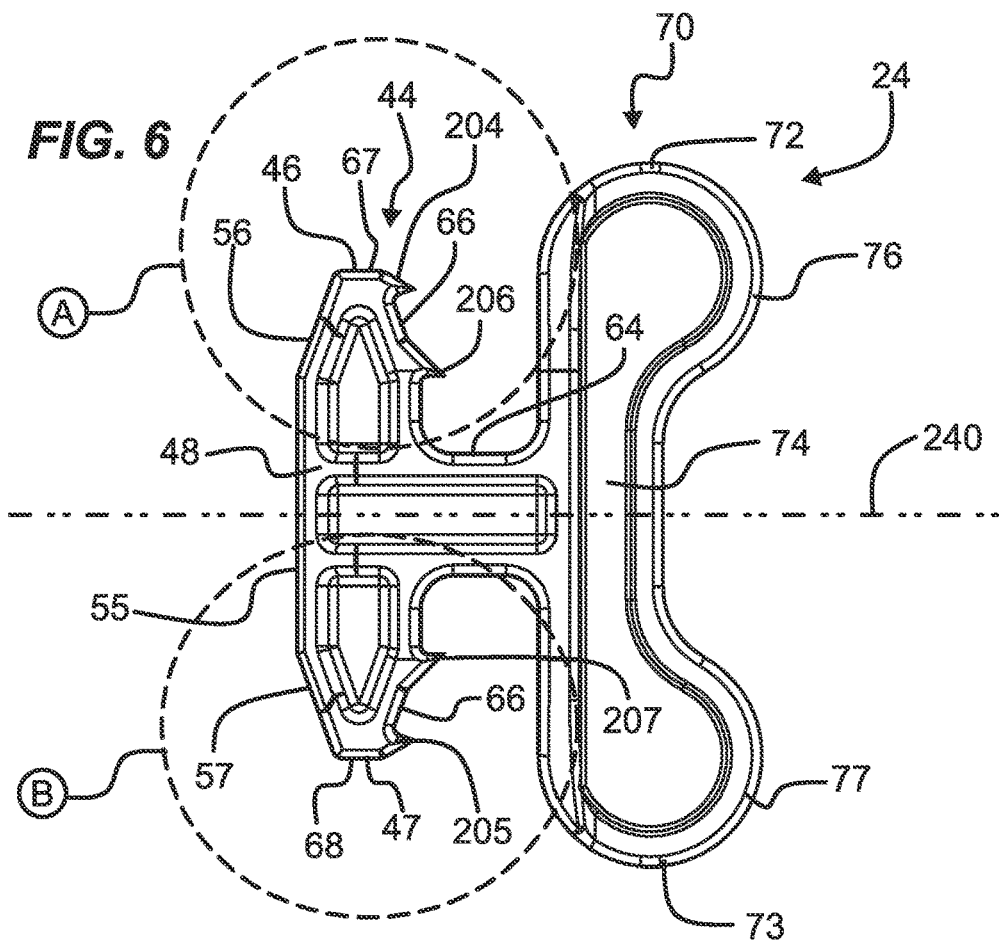
FIG. 6 is a top plan view of the connection device of FIGS. 4 and 5.
Figure 7:
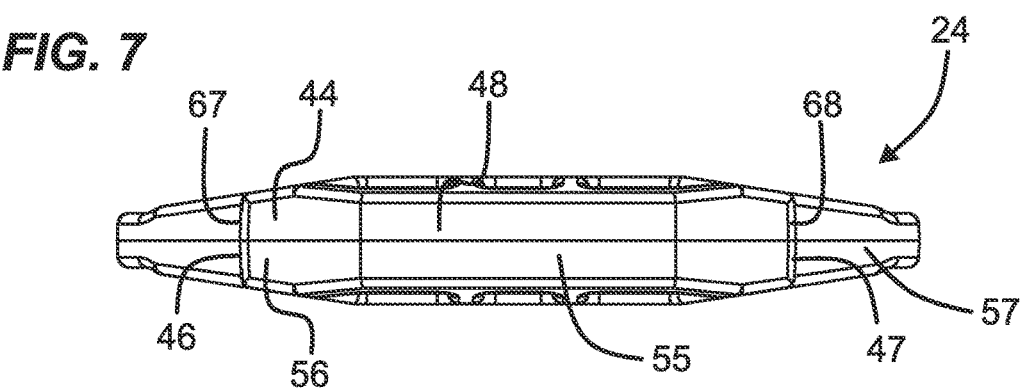
FIG. 7 is an end view of the connection device of FIG. 6.
Figure 8:
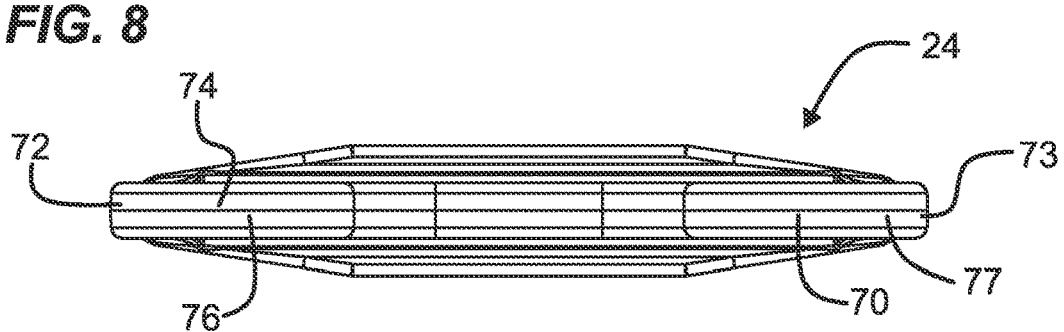
FIG. 8 is another end view of the connection device of FIG. 6, depicting the opposite end of that shown in FIG. 7.
Figure 9:
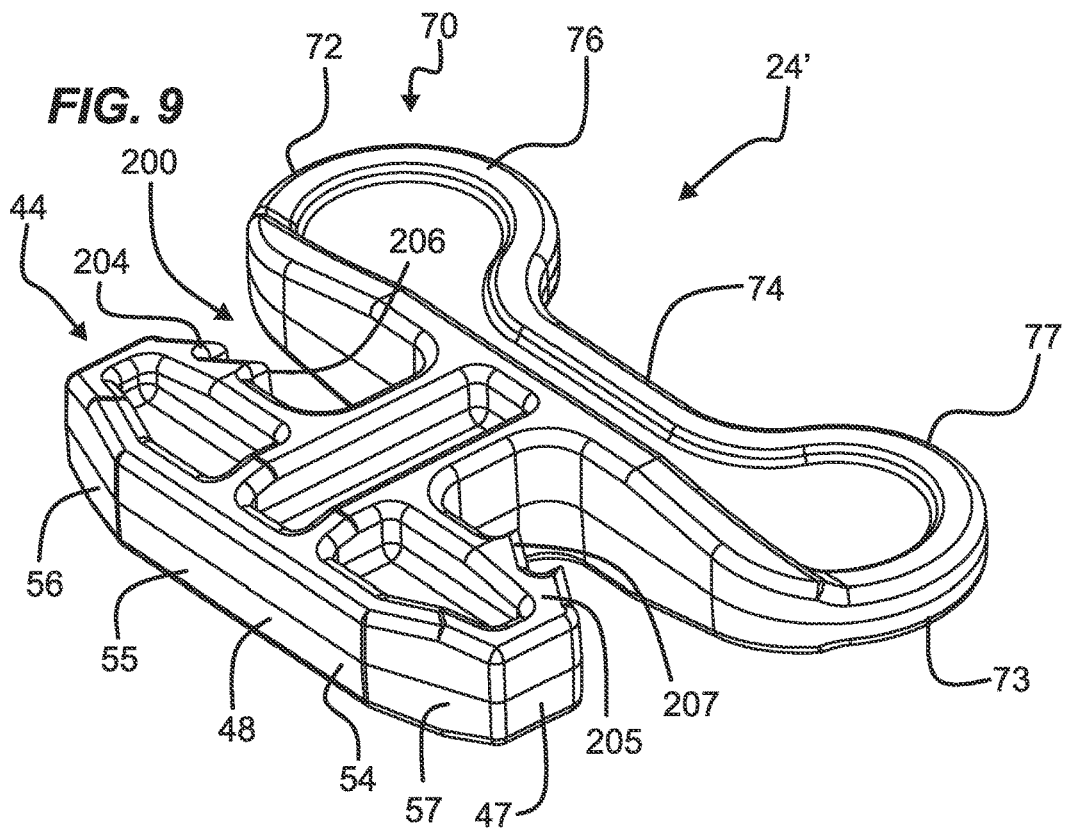
FIG. 9 is a perspective view of a second embodiment of connection device constructed in accordance with principles of this disclosure.
Figure 10:
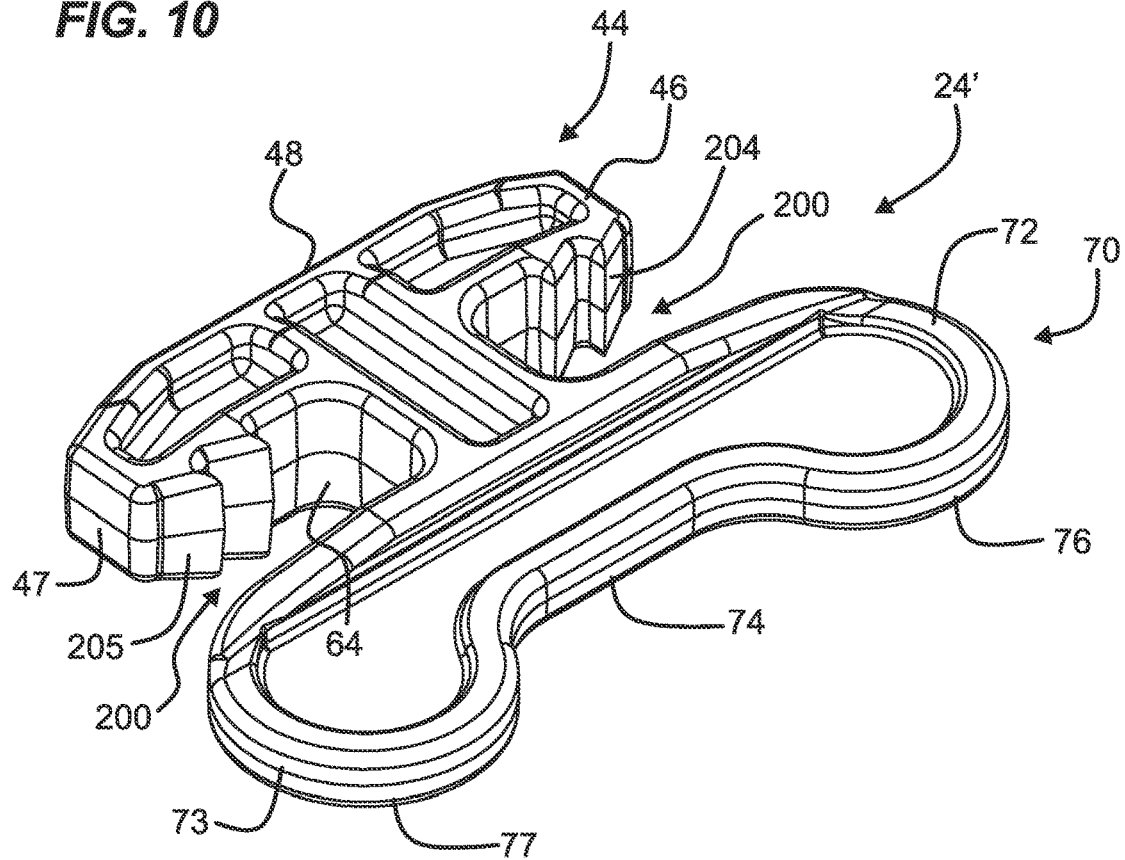
FIG. 10 is another perspective view of the connection device of FIG. 9.

The insertion member extension 48 includes an internal face 66 facing toward a handle member 70. The insertion member extension 48 is on an opposite side as the external face 54. As can be seen in FIGS. 5 and 6, the shank 64 intersects the internal face 66. The first and second insertion ends 46, 47 join the external face 54 and the internal face 66, in this embodiment.

While many different shapes are possible, in the embodiment shown, the first insertion end 46 has a planar first end face 67, and the second insertion end 47 has a planar second end face 68.

Still in reference to FIGS. 4-8, one example connection device 24 includes, as mentioned above, an integral shank 64 extending from the insertion member extension member 48 and being spaced from each of the first and second insertion member ends 46, 47. A variety of implementations are possible. In the embodiment depicted, the shank 64 extends generally perpendicular from the insertion member extension 48.

The shank 64 has a length that is defined as being between the insertion member 44 and a handle member 70, described below. The length of the shank 64 is less than the length of the insertion member 44, in one example.

In the embodiment shown, the connection device 24 includes, as previously mentioned, handle member 70. Preferably, the handle member 70 is integral with the shank 64. The handle member 70 extends from the shank 64 at an end of the shank 64 remote from the insertion member 44.

In the example depicted, the handle member 70 has first and second handle ends 72, 73. Between the first handle end 72 and the second end 73 is a handle member extension 74.

In the embodiment shown, the shank 64 is spaced from each of the first and second handle ends 72, 73.

The handle member 70 has a length defined between the first handle end 72 and the second handle end 73. While many designs are contemplated, in the particular embodiment illustrated, the length of the handle member 70 is greater than the length of the insertion member 44. In one example, the length of the shank 64 is less than half of the length of the handle member 70 and insertion member 44. These relative dimensions cooperate with the slot 36 and allow for quick, convenient fastening of the first and second webs 20, 22.

In example embodiments, the length of the handle member 70 is not greater than 100 mm, typically, 30-80 mm, for example, 45-55 mm.

In the embodiment shown, the length of the handle member 70 is at least 10 percent greater than the length of the insertion member 44. This relative geometry helps to ensure that the connection device 24 will stay in place within the slot 36 and not work its way out.

In the embodiment shown, the handle member extension 74 includes first and second lobes or ears 76, 77 projecting therefrom. The lobes or ears 76, 77 are projecting away from the insertion member 44. In the embodiment shown, the first and second ears 76, 77 are rounded and are even with the first and second handle ends 72, 73. The handle member extension 74 is shown as being straight between the first and second ears 76, 77.

In accordance with principles of this disclosure, the connection device 24 includes a plurality of barbs 200. The barbs 200 project from the insertion member 44 and toward the handle member 70.

While many different arrangements are possible, in the example shown, the plurality of barbs 200 project from the internal face 66 of the insertion member extension 48 and toward the handle member 70.

Figure 17:
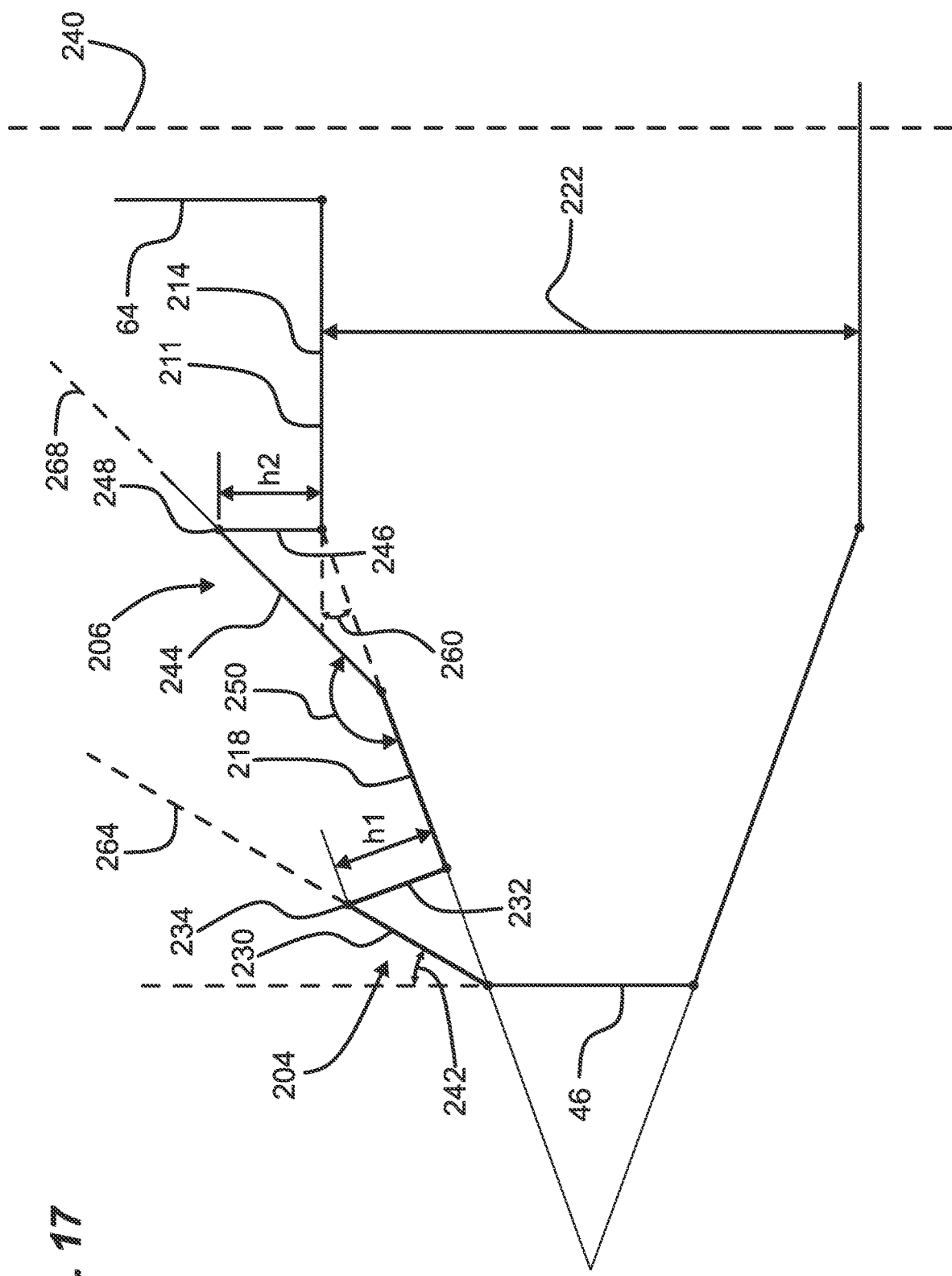
FIG. 17 is an enlarged view of an outline of portion A of the connection device of FIG. 6.
Figure 18:
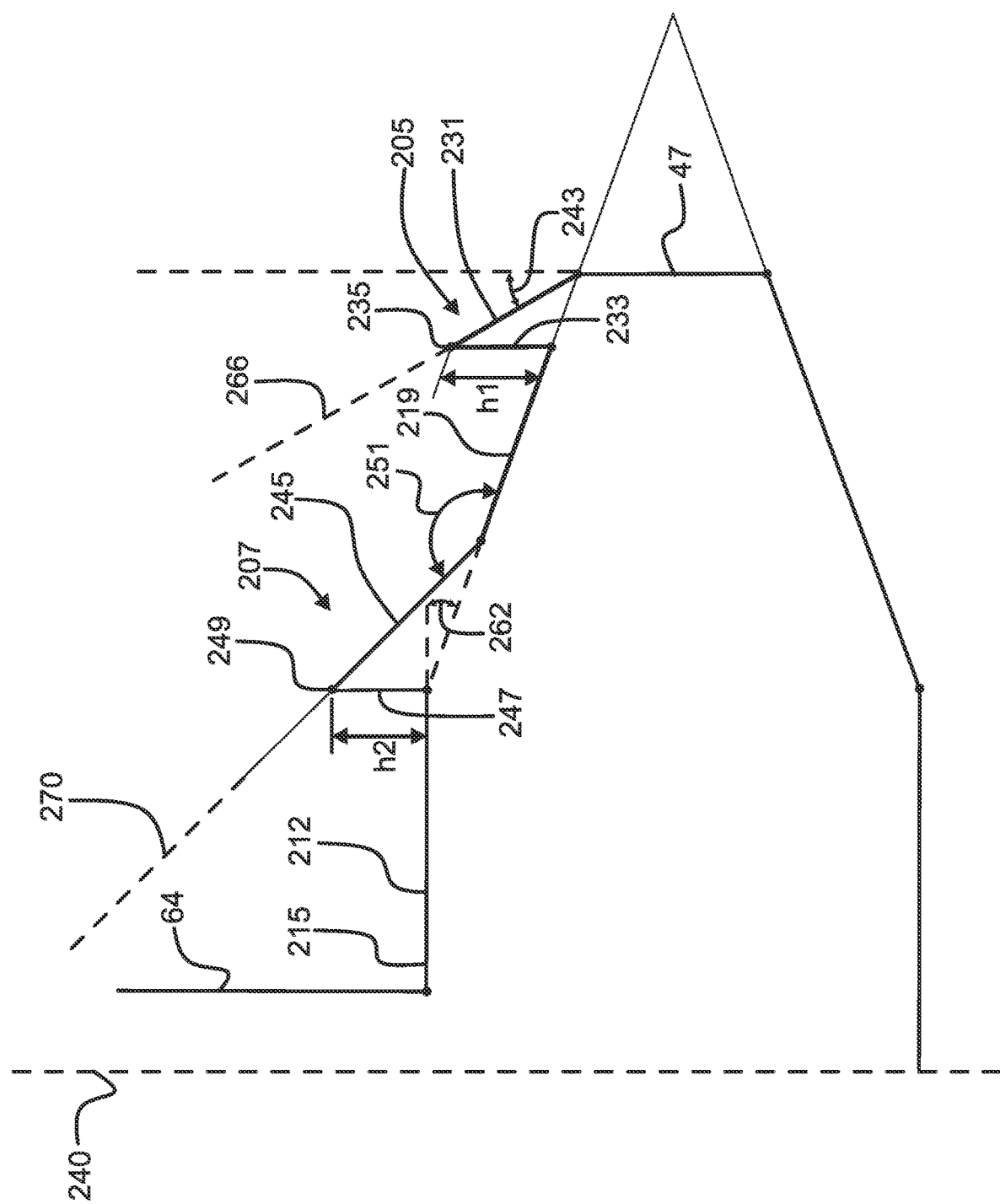
FIG. 18 is an enlarged view of an outline of portion B of the connection device of FIG. 6.

Attention is directed to FIGS. 17 and 18, which show an enlarged portion of the insertion member 44 at sections A and B from FIG. 6. The plurality of barbs 200 includes at least one barb 204, 205 projecting from the internal face 66 on opposite sides of the insertion member extension 48. By the term "opposite sides of the insertion member extension", it is meant opposite sides of the extension 48 from where the shank 64 intersects the intersection 48.

In many preferred embodiments, the plurality of barbs 200 includes at least two barbs 204, 206 (FIG. 17) on one side of the shank 64, and two barbs 205, 207 (FIG. 18) on the opposite side of the shank 64 projecting from the internal face 66 of the insertion member extension 48.

The internal face 66 has a first portion 211 and a second portion 212. The first portion 211 is between the first insertion end 46 and the shank 64. The second portion 212 is between the second insertion end 47 and the shank 64. The plurality of barbs 200 includes at least one barb 204, and in this example, two barbs 204, 206, extending from the first portion 211 toward the handle member 70. The plurality of barbs 200 includes at least one barb 205, and in this example, two barbs 205, 207 extending from the second portion 212 toward the handle member 70.

As can be seen in FIGS. 17 and 18, the first barb 204 on the first portion 211 is adjacent the first insertion end 46. Similarly, the first barb 205 on the second portion 212 is adjacent the second insertion end 47.

The first portion 211 includes a straight section 214 extending from the shank 64. Similarly, the second portion includes a straight section 215 extending from the shank 64. In the embodiment of FIGS. 4-8, 17, and 18, the first portion 211 includes a first beveled section 218 which is angled away from the first straight section 214 and downward to the first insertion end 46 at a non-zero angle 260 (FIG. 17). The angle 260 can be, for example, less than 60°; less than 45°; less than 30°; about 10-25°; and preferably, about 20°.

In FIG. 18, the second portion 212 includes a second beveled section 219 being angled away from the second straight section 215 and downward to the second insertion end 47 at a non-zero angle 262. The non-zero angle 262 can be less than 60°; less than 45°; less than 30°; between 10-25°; and preferably about 20°. The angle 262 will be about the same as the angle 260 of the first beveled section 218.

As will be described further in connection with the embodiment of FIGS. 11-13, in other embodiments, the first portion 211 and second portion 212 can be straight between the shank 64 and the first insertion end 46. Similarly, the second portion 212 can be straight between the shank 64 and the second insertion end 47. That is, in the embodiment of FIGS. 11-13, there are no beveled sections 218, 219.

Shank 64 has a shank length between the insertion member 44 and the handle member 70. In this example, the shank length is greater than a length of the first straight section 214 and second straight section 215.

The first barb 204 on the first portion 211 is adjacent the first insertion end 46, while the second barb 206 is between the first straight section 214 and the first beveled section 218.

A first of the barbs 205 on the second portion 212 is adjacent the second insertion end 47, while the second barb 207 on the second portion 212 is between the second straight section 215 and the second beveled section 219.

The barbs 200 can have a variety of shapes and sizes. Typically, a largest distance between the internal face 66 and the external face 54 shown at dimension 222 in FIG. 17 is at least five times a height h1 of barb 204 and height h2 of barb 206. Barbs 205 and 207 also have heights h1, h2. In the example shown, the height h1 of barb 204 and barb 205 are the same, while the height of h2 of barbs 206 and barb 207 are the same. In many example embodiments, the heights h1 and h2 are equal to each other, although many different geometries could be used. In this example, the height of each of h1 and h2 is less than 0.1 inch, greater than 0.02 inch, and typically 0.05-0.09 inch, preferably about 0.075 inch. In some examples, the heights h1, h2 will be about 3-10%, typically about 4-6%, or about 5%, of the overall length of the insertion member 44.

In the example embodiment shown, the barbs 204 and 205 are similar in shape, while the barbs 206 and 207 are similar in shape. Example usable dimensions for these barbs 200 follows.

For barbs 204, 205, which are located adjacent the end face 46, 47, the barbs 204, 205 have at least one beveled surface 230 (barb 204) and 231 (barb 205). The beveled surface 230, 231 intersects with an upright surface 232, 233. In the example shown, upright surfaces 232, 233 are generally orthogonal to the respective beveled section 218, 219. Beveled surface, 230, 231 intersects with upright surface 232, 233 at an end point 234, 235.

Each of the beveled surfaces 230, 231 forms a ramp and are angled relative to the end faces 46, 47. Each beveled surface 230, 231, in this embodiment, extends along a plane (the edge of the plane being shown in broken lines at 264, 266 in FIGS. 17 & 18) that intersects a longitudinal axis 240 (FIG. 6). The longitudinal axis 240 bisects the device 24 and extends through each of the insertion member 44, handle member 70, and along the shank 64. In the example embodiment shown, each beveled surface 230, 231 extends along a plane that intersects the longitudinal axis 240 in the vicinity of either the shank 64, the handle member 70, or in the space adjacent (above) the handle member 70 and away from the insertion member 44, when the connection device 24 is oriented with the handle member 70 in the most upright position and the insertion member in the lower most position.

The beveled surface 230, 231 is angled relative to a plane containing the end surface 46, 47 at angle 242, 243. Angle 242, 243 can be a variety of angles, and in the embodiment shown, ranges between 20-80°, for example 25-45°, and is shown at 30°.

Barbs 206, 207 similarly have beveled surface 244, 245 intersecting with upright surface 246, 247 at end point 248, 249. Beveled surface 244, 245 extends along a plane (the edge of the plane being shown in broken lines at 268, 270 in FIGS. 17 & 18) that intersect the longitudinal axis 240. In the preferred embodiment shown, the beveled surface 244, 245 intersects the longitudinal axis 240 at one of the vicinity of the shank 64, the handle 70, or in a space (above) the handle 70 and away from the insertion member 44, when the connection device 24 is oriented with the handle member 70 upright and the insertion member 44 lowermost. The beveled surface 244, 245 can be at a variety of different angles, the angle being shown at 250, 251 relative to the bevel section 218, 219. Angle 250, 251 is non straight and greater than 180°; less than 270°; in a range of 120-150°, preferably about 135°.

Figure 19:
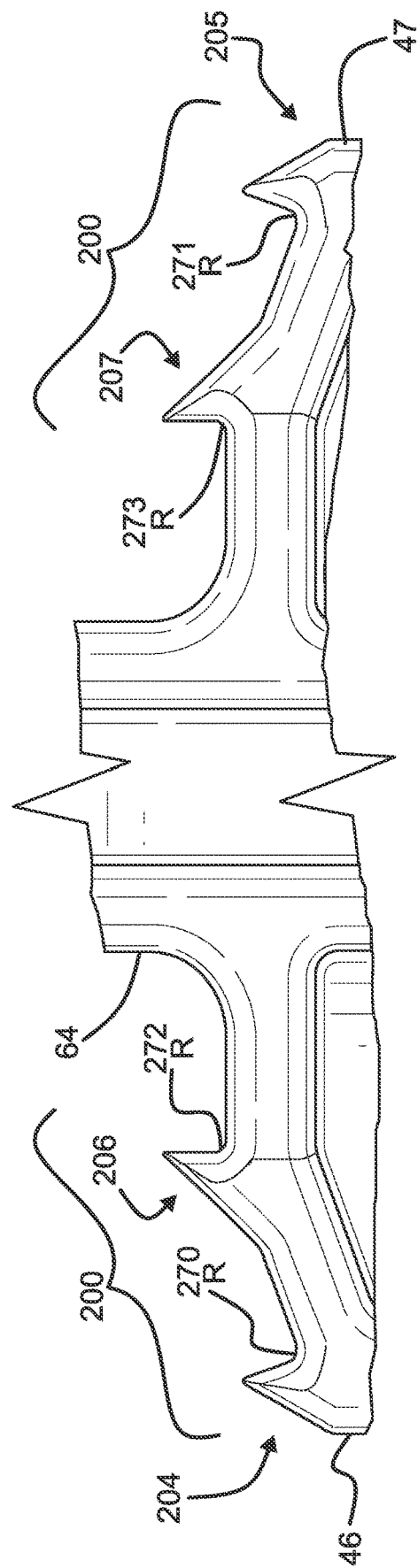
FIG. 19 is a an enlarged view of a portion of the connection device of FIG. 4.

In reference now to FIG. 19, each of the barbs 204, 205, 206, 207 has an inside radius, relative to the insertion member 44, shown at 270, 271, 272, 273, respectively. While a variety of sizes are possible, and can be varied between each, in this example, the inside radius 270, 271, 272, 273 are about the same, within a range of 0.010 in.-0.030 in., typically about 0.015-0.025 in. or about 0.020 in. Relative to the length of the insertion member 44, the measurement of the inside radius 270, 271, 272, 273 is greater than 0.75%; less than 5%; and typically about 1-1.5% or about 1.3% of the length of the insertion member 44.

In reference again to FIG. 6, the connection device 24 can be made using a variety of techniques. Preferably, the connection device 24 is made from one single solid piece, such as by injection molded plastic, including high density polyethylene, or polypropylene. In other embodiments, the connection device 24 could be made from a metal material, either molded as a single piece or by attaching together multiple parts.

Still in reference to FIG. 6, in this embodiment, the connection device 24 is symmetrical about the longitudinal axis 240. Other arrangements are possible.

Figure 11:
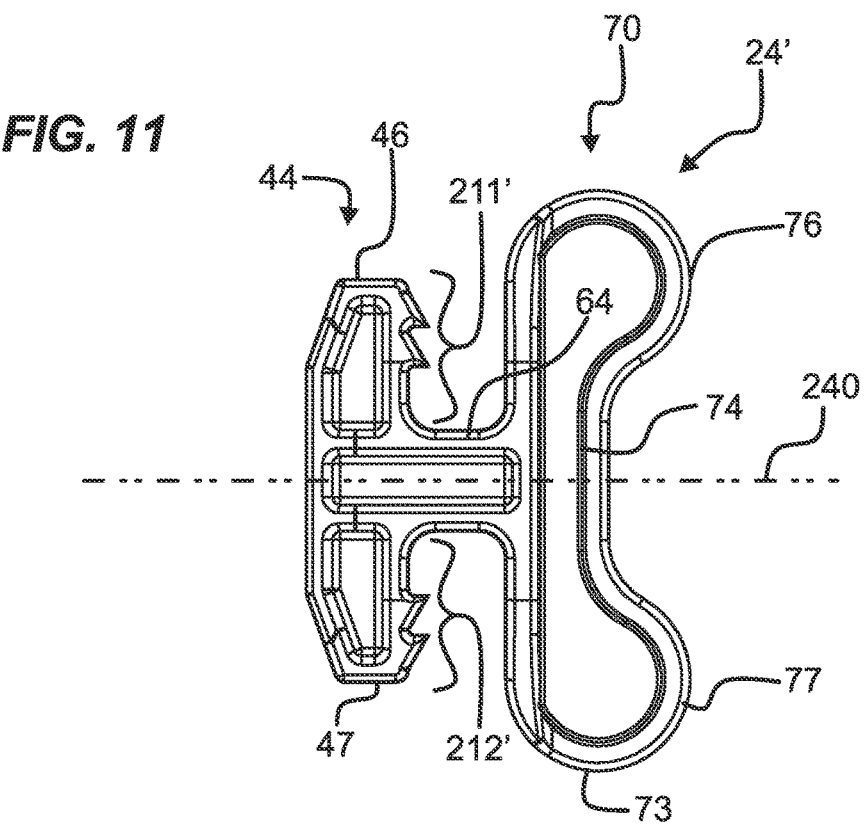
FIG. 11 is a top plan view of the connection device of FIG. 9.
Figure 12:
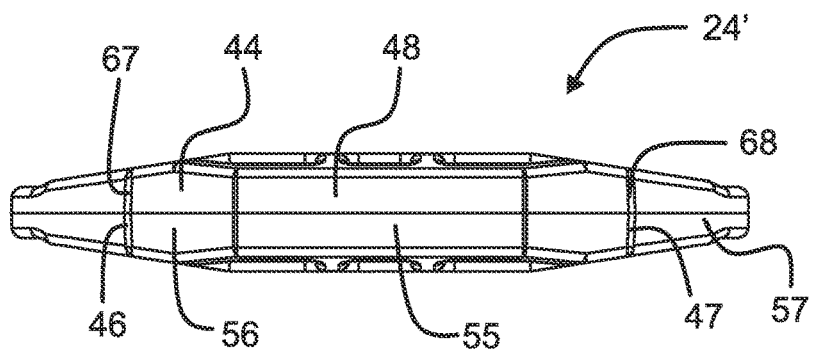
FIG. 12 is a an end view of the connection device of FIG. 9.
Figure 13:
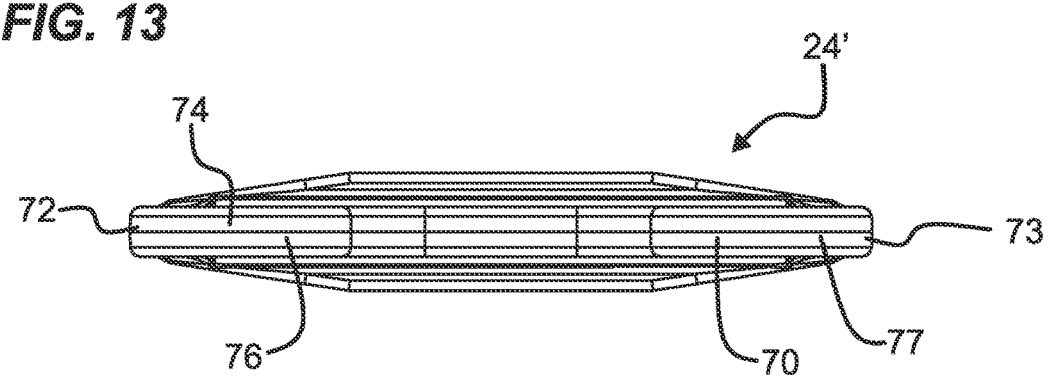
FIG. 13 is another end view of the connection device of FIG. 9, depicting the opposite end of that shown in FIG. 12.

Turning now to the embodiment of FIGS. 9-13, an alternate connection device is shown at 24'. The connection device 24' is the same as device 24 described above (and, hence, uses the same reference numbers), with the exception of the first portion 211' and second portion 212' (FIG. 11). First portion 211' is straight between the shank 64 and the first insertion end 46. Similarly, second portion 212' is straight between the shank 64 and the second insertion end 47. That is, in the embodiment of FIGS. 11-13, there are no beveled sections 218, 219.

Turning again to FIG. 3, it can be seen that in use, the connection device 24 will have the handle member 70 on one side 40 of the overlap region, and the insertion member 44 on second side 42 of the overlap region 38. The shank 64 extends through the overlap region 38. Methods of using the connection device 24 are described further below.

In use, the connection device 24 (including 24') can be utilized to fasten two expanded cell confinement structures together. The method includes aligning two expanded cell confinement structures 18 so that at least one open slot 36 defined by first web 20 is aligned with at least one slot 36 defined by second web 22 to form overlap region 38.

Connection device 24 (or 24') is provided. Connection device 24 (or 24') is used by inserting the insertion member 44 from the first side 40 of the overlap region 38 through the aligned open slots 36 of the overlap region 38. This provides the insertion member 44 on the second side 42 of the overlap region 38 with the plurality of barbs 200 projecting from the insertion member 44 toward the second side 42 of the overlap region 38. It provides the handle member 70 on the first side 40 of the overlap region 38. It provides the shank 64 to extend through the overlap region 38.

The method also includes rotating the handle member 70 to rotate the connection device 24 within the overlap region 38. This helps to lock the connection device 24 within the slots 36.

Figure 14:
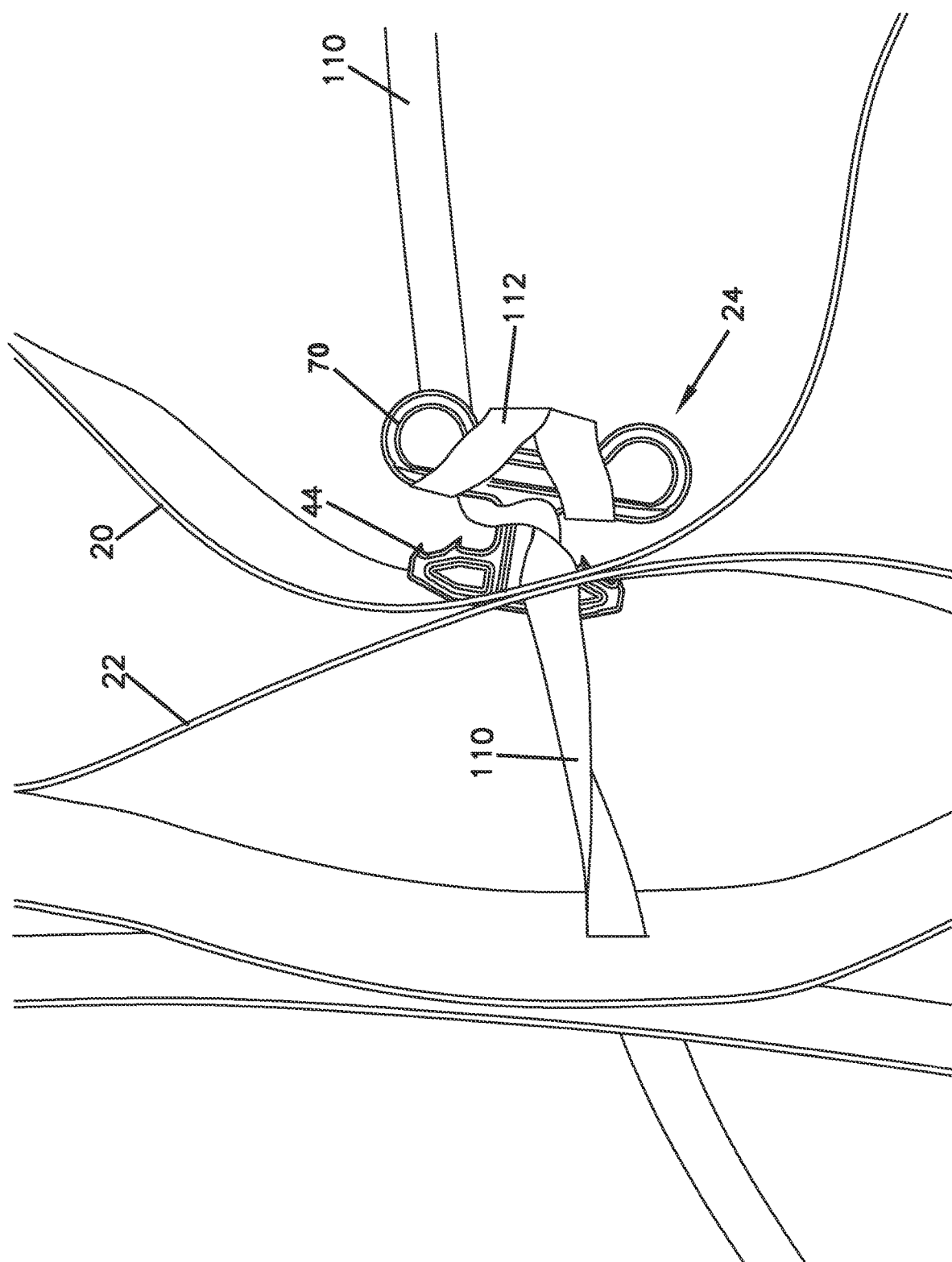
FIG. 14 is a schematic, perspective view of a step of using the connection device along with a tendon.
Figure 15:
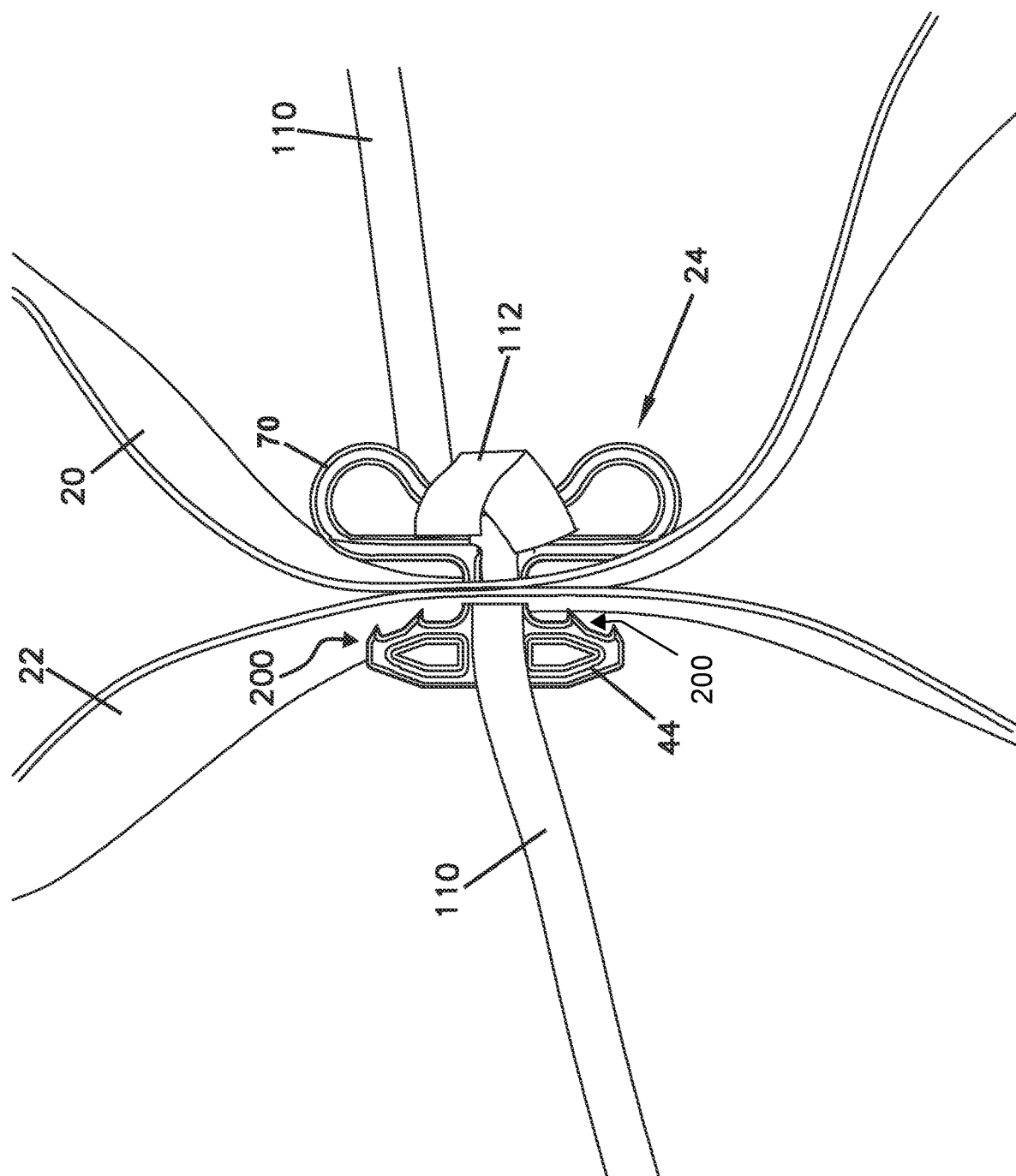
FIG. 15 is a schematic, perspective view of another step of using the connection device with a tendon.
Figure 16:
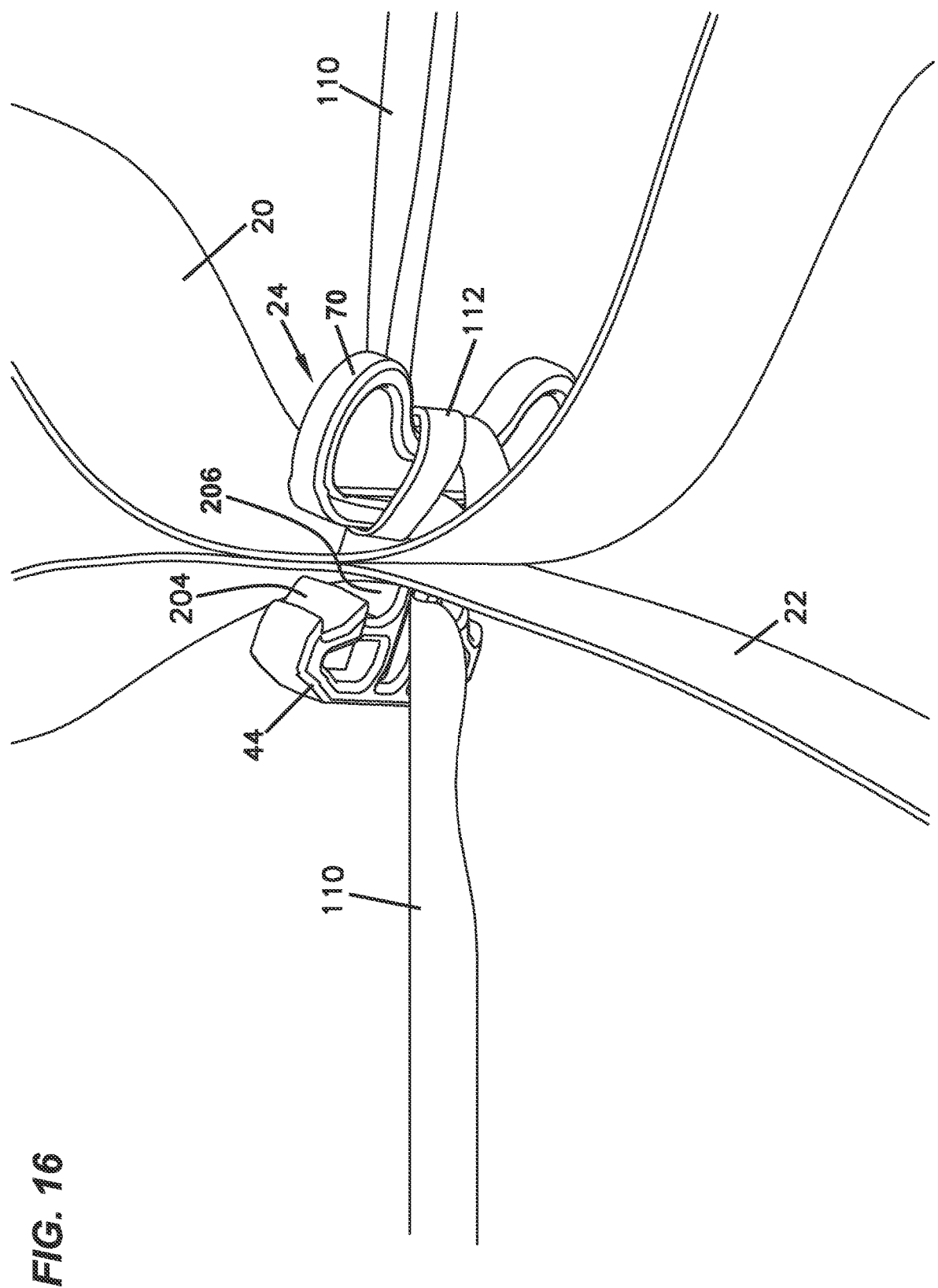
FIG. 16 is a schematic, perspective view of another step of using the connection device with a tendon.

An example of use of a tendon 110 is shown in connection with the connector device 24 of FIGS. 4-8 as shown in FIGS. 14-16. In FIG. 14, the tendon 110 is illustrated as wrapped around the handle member 70 at wrap 112. The tendon 110 is positioned under the handle member 70 and wrapped up and over one side of the handle 70. The tendon 110 continues wrapping around the upper portion of the handle 70 to form a cross-wrap. In FIG. 14, it can be seen how the insertion member 44 is inserted or engaged into the slots 36 of two adjacent webs 20, 22, either end-to-end or edge-to-edge. The tendon 110 can also be seen extending through the slots 36 of the webs 20, 22, although the slots 36 are not visible in FIG. 14. FIG. 15 shows full engagement of the connector device 24 through the slots 36. The barbs 200 can be seen pressing against web 22. In FIG. 16, the final step of rotating the connector device 24 to lock the connector device 24 within the slots 36 is illustrated. By comparing FIGS. 15 and 16, it can be seen that the connector device 24 is rotated about 90 degrees.

The connection device 24, 24' is usable in a kit including a plurality of expanded cell confinement structures 18 and a plurality of the connection devices 24, 24' useable to connect the cell confinement structures.

In use, the slots 36 will be non-circular, for example, elliptical, or elongated-circular, or racetrack-shaped. In one embodiment, the slots 36 are shaped like two semi-circles separated by a rectangle of which one side of the rectangle is equal to the diameter of the semi-circle. When used, this shape will have a major axis and a minor axis. The aspect ratio of useable slots 36 as a ratio of the minor axis compared to the major axis is about 3:11. When compared to the dimensions of the connection device 24, the major axis of the slot 36 has a length that is 85-95%, for example, 92%, of the length of the insertion member 44, 90. The minor axis of the slot 36 will be 20-30%, for example, about 25%, of the length of the insertion member 44. Further, the minor axis of the slot 36 will be about 101% of the width or thickness of the connection device 24.

EXPERIMENTAL

The connector device 24 (FIGS. 4-8) was tested, along with the connector device 24' (FIGS. 9-13) and the prior art connector device described in U.S. Pat. No. 8,092,122 (no barbs). The devices were placed into slots 36 of cell confinement structures 18 and put under a tensile load, i.e. a pulling force.

The test method used a modified version of ASTM D4885 to evaluate the performance of the connector devices by subjecting test specimens to tensile loading using a Curtis "Sure-Grip" tensile testing machine. Specimens were prepared by inserting a connector through the slots of two pieces of cell confinement material, and then the pieces of cell confinement material were folded over and inserted into opposing clamps of the tensile testing machine. For each test run, a new connector and new pieces of cell confinement material were used.

Figure 4:
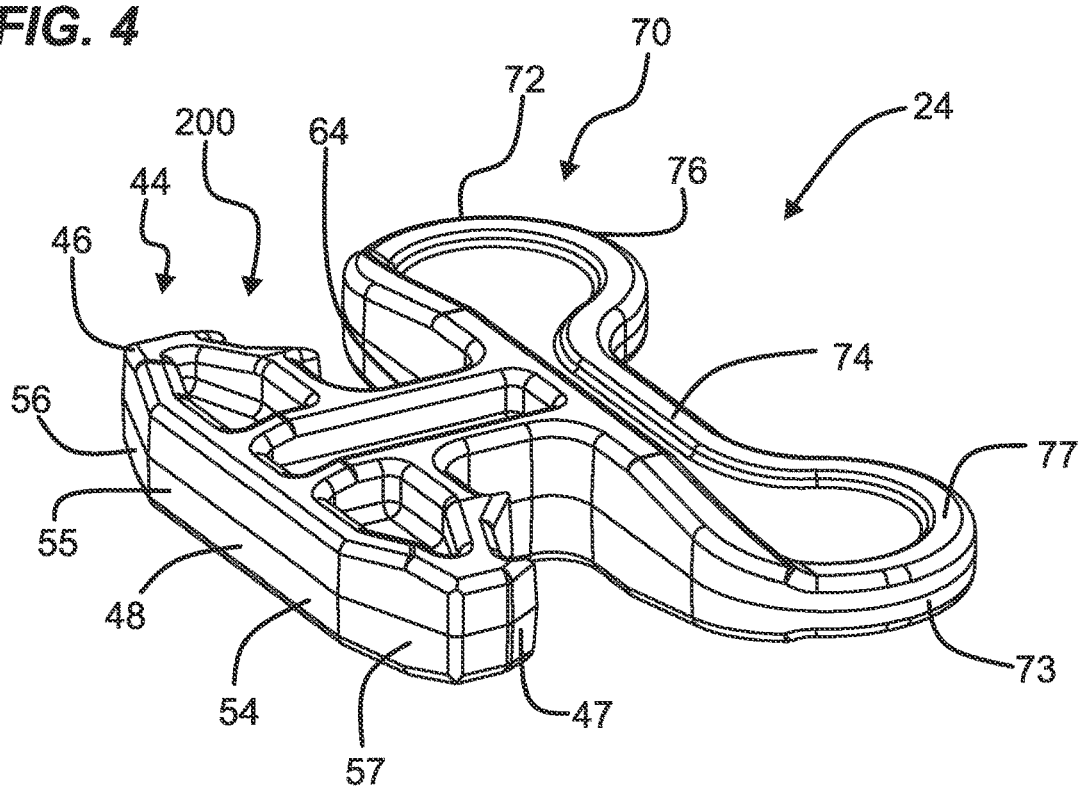
FIG. 4 is a perspective view of one embodiment of a connection device, constructed in accordance to principles of this disclosure.
Figure 20:
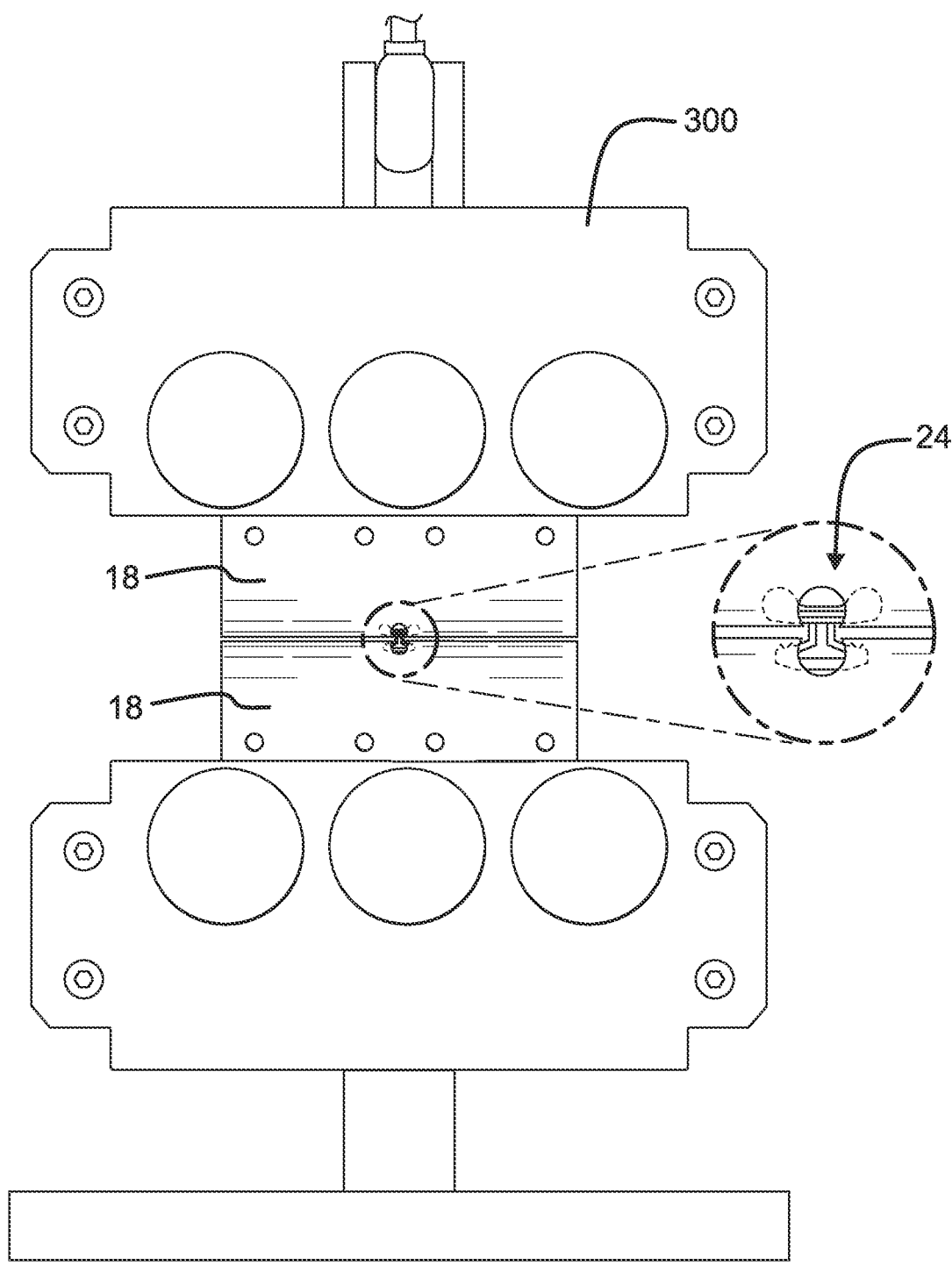
FIG. 20 is a schematic, perspective view depicting the connection device of FIG. 4 connecting together two expanded cellular confinement structures being tested for performance in a tensile testing machine.
Figure 21:
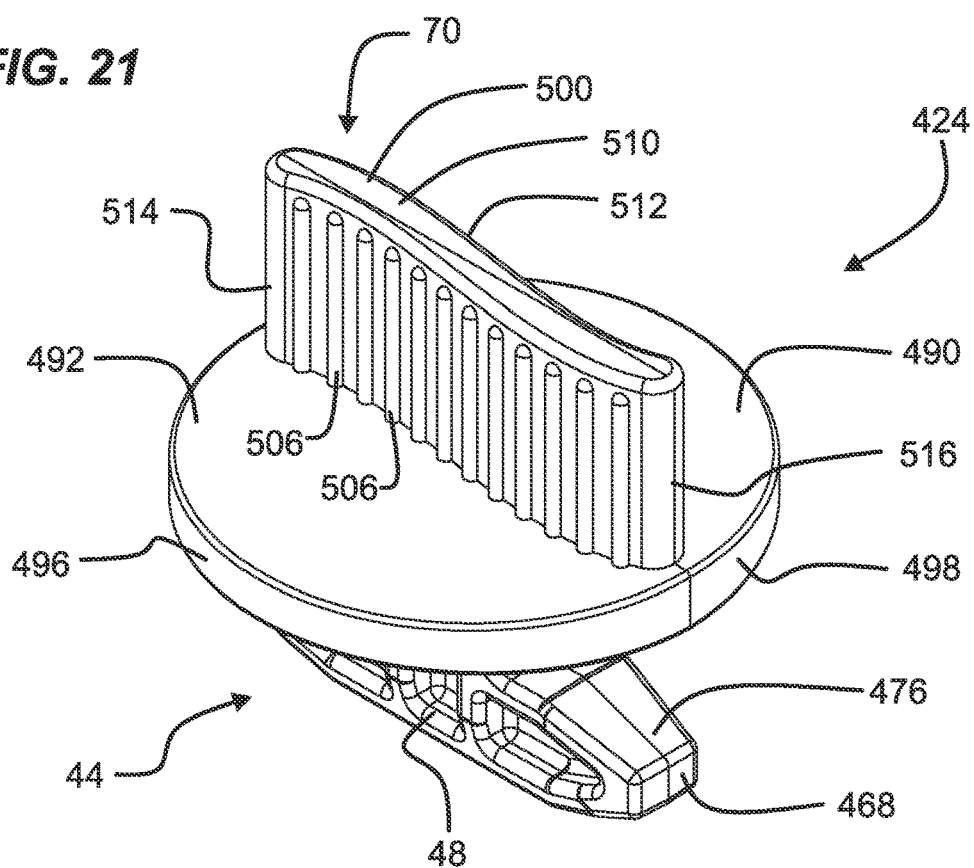
FIG. 21 is a perspective view of another embodiment of a connection device, constructed in accordance with principles of this disclosure.
Figure 22:
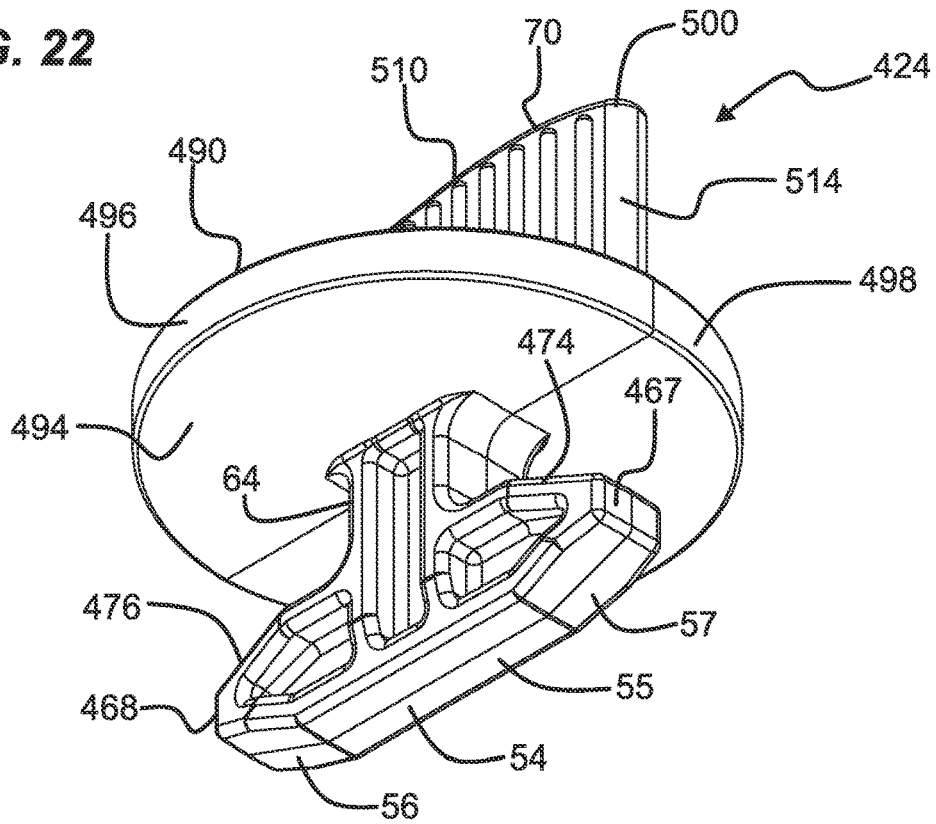
FIG. 22 is a bottom perspective view of the connection device of FIG. 21.

FIG. 20 illustrates an assembled test specimen, such as the connection device 24 of FIG. 4, in the tensile testing machine 300. Specimens were gripped across their entire width in the clamps of a constant rate of extension type tensile testing machine operated at a prescribed rate of extension, applying a uniaxial load to the specimen until the specimen failed. The machine was equipped with a device for recording the tensile force and the amount of separation of the grips with accuracy to ±2%. In addition to tensile force and separation, the type of failure was also recorded, noting whether the connector broke, slipped through the slot, or ripped through the confinement material.

The following results were obtained:

Results

| Connection Device | Test ID | Pull Out Resistance (lbs) | Failure Notes | Avg. Pull Out Resistance (lbs) |
|---|---|---|---|---|
| Prior art connection device of U.S. Pat. No. 8,092,122 | CTRL-A | 271 | Pulled through slot 36 | 278.8 |
| | CTRL-B | 266 | Pulled through slot 36 | |
| | CTRL-C | 288 | Pulled through slot 36 | |
| | CTRL-D | 289 | Pulled through slot 36 | |
| | CTRL-E | 280 | Pulled through slot 36 | |
| Connection device 24 | ALT1-A | 319 | device ripped thru material | 318.6 |
| | ALT1-B | 319 | device snapped | |

-continued

| Connection Device | Test ID | Pull Out Resistance (lbs) | Failure Notes | Avg. Pull Out Resistance (lbs) |
|---|---|---|---|---|
| (FIGS. 4-8) | ALT1-C | 318 | device ripped thru material | |
| | ALT1-D | 320 | device snapped | |
| | ALT1-E | 317 | device snapped | |
| Connection device 24' (FIGS. 9-13) | ALT2-A | 321 | device snapped | 301.6 |
| | ALT2-B | 300 | device snapped | |
| | ALT2-C | 294 | device snapped | |
| | ALT2-D | 297 | device snapped | |
| | ALT2-E | 296 | device snapped | |

As demonstrated in the results, the connection device 24 (FIGS. 4-8) obtained the best results, failing at 318.6 lbs of resistance, which was better than the prior art connection device. The device 24 outperformed the device 24'. Both the device 24 and 24' well outperformed the prior art connection device. The connection device 24' (FIGS. 9-13) failed at 301.6 lbs of resistance.

As demonstrated above, embodiments of the present invention address a common failure mode of connection devices, i.e., slipping through a slot. In many prior art devices, a connector may snap due to, for example inferior design. Additionally, many prior art devices remain intact but slip out of engagement with the geocell. Embodiments of the present invention address the loss of engagement with a geocell by increasing the pull out resistance of the connector. In some embodiments, the present invention is a connector having a pull out resistance of greater than 296 lbs. when measured using a modified version of ASTM D4885 as described above in connection with the testing system shown in FIG. 20.

Additional Embodiments, FIGS. 21-31

FIGS. 21-31 show additional embodiments for the connection device 24. The embodiment of FIGS. 21-26 is shown at 424, while the embodiment of FIGS. 27-31 is shown at 624. The connection device 424, 624 has many features in common with connection device 24, and those will use common reference numbers, but the description of each feature will not again be repeated here. Rather, description of those common features is incorporated by reference here.

The connection device 424, 624 has insertion member 44. In the embodiment of FIG. 25 and FIGS. 27-30, the insertion member 44 includes barbs 200, as shown and described with respect to FIGS. 4-19, above. In the embodiment of FIGS. 21-24 and FIG. 31, the insertion member 44 does not include barbs along the internal face 66. Rather, the internal face 66 is unbarbed and is shown at 466.

In this embodiment, the internal face 466 has a first angled section 474, and a second angled section 476. A first mid-section 478 extends between the first angled section 474 and the shank 64. A second mid-section 480 extends between the second angled section 476 and the shank 64. The mid-sections 478, 480 are shown as being generally planar and parallel to mid-section 55 on the external face 54. The first angled section 474 extends from the first insertion end 467 to the first mid-section 478 at a non-zero angle, which can be 60° or less; 45° or less; 30° or less; for example 15-25°, or about 20°. The second angled section 476 extends from the second insertion end 468 to the second mid-section 480 at a non-zero angle, which can be 60° or less; 45° or less; 30° or less; for example 15-25°, or about 20°. In preferred arrangements, the angle of the first angled section 474 and second angled section 476 are the same.

The internal face 466 faces toward the handle member 70. The shank 64 intersects the internal face 466. The first and second insertion ends 467, 468 bridge between to join the external face 54 and the internal face 466, in this embodiment.

The connection device 424, 624 has shank 64 and handle member 70. The handle member 70 has variations from the device 24, and will be further described below.

Figure 23:
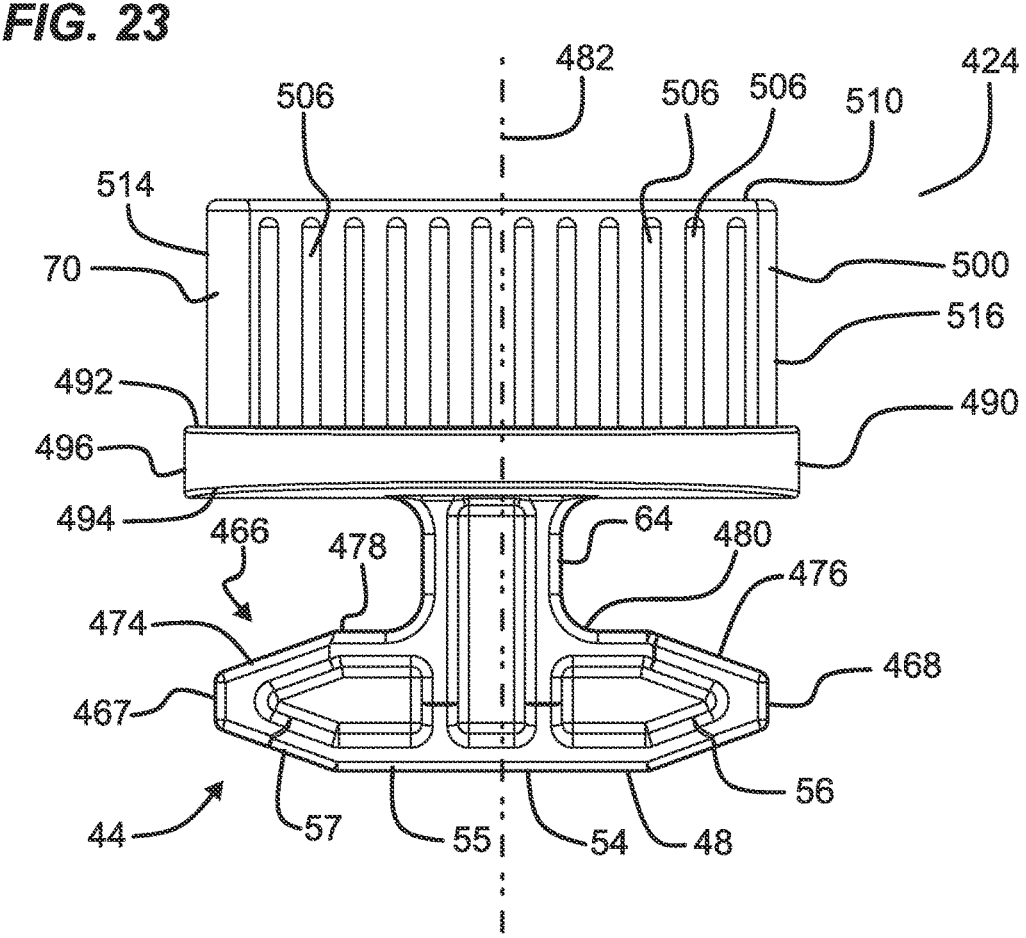
FIG. 23 is a front view of the connection device of FIG. 21.
Figure 29:
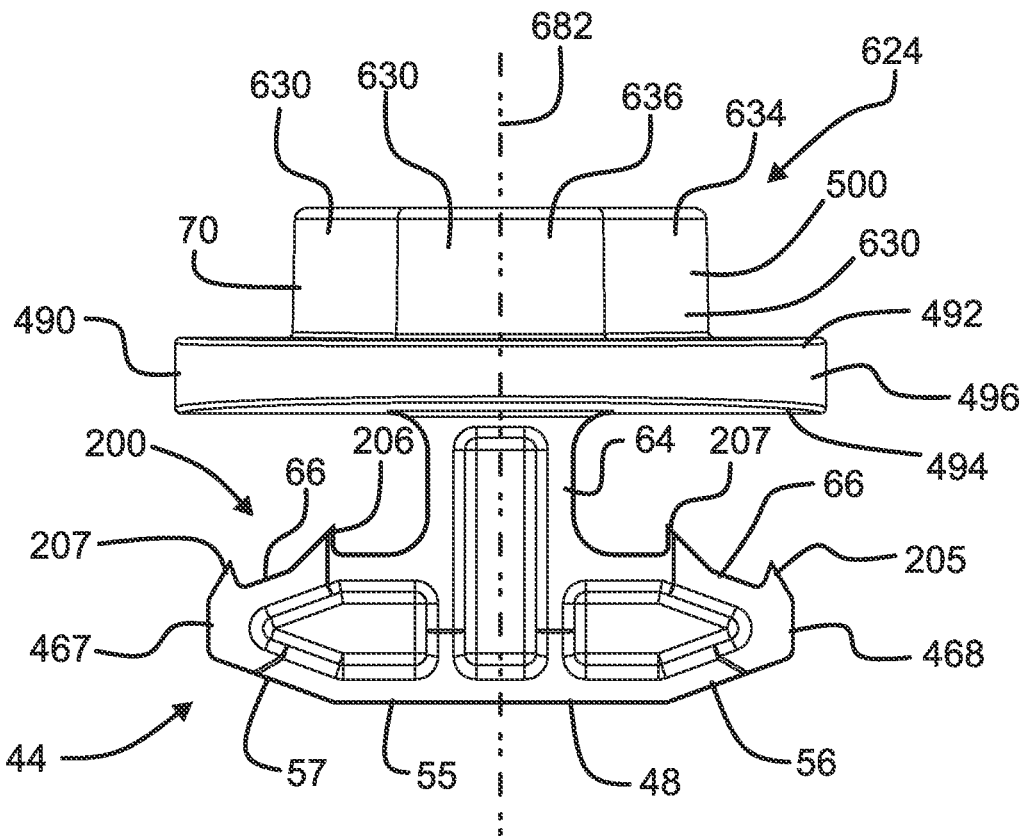
FIG. 29 is a front view of the connection device of FIG. 27.
Figure 30:
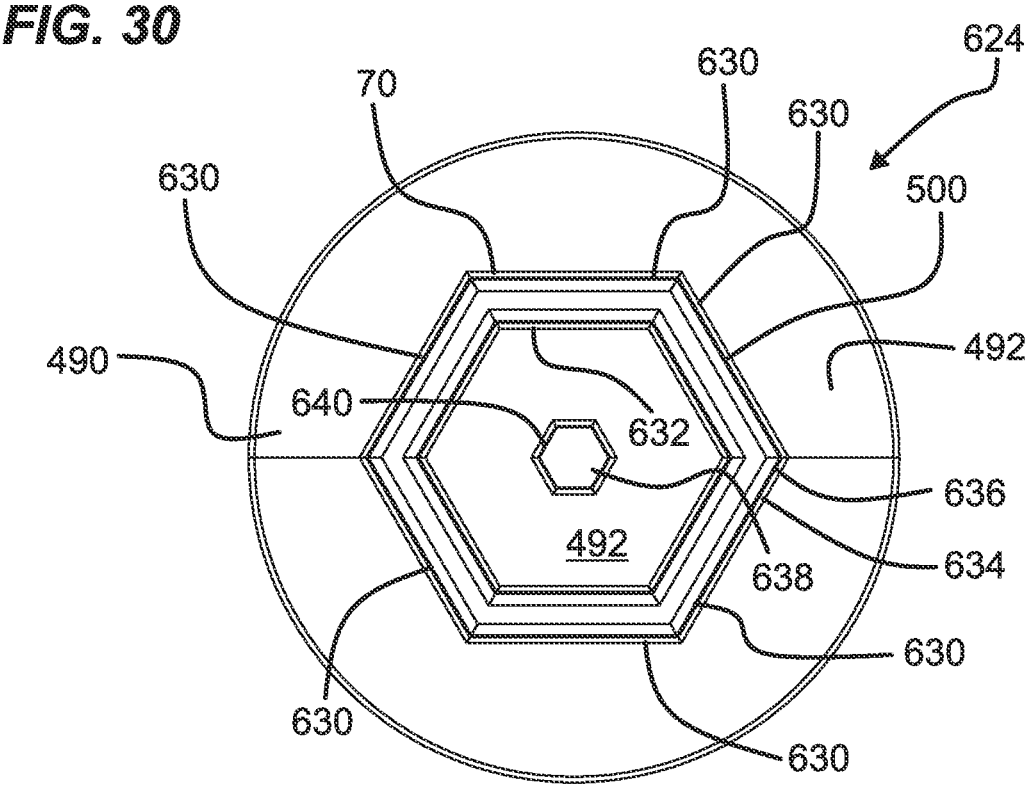
FIG. 30 is a top plan view of the connection device of FIG. 27.
Figure 31:
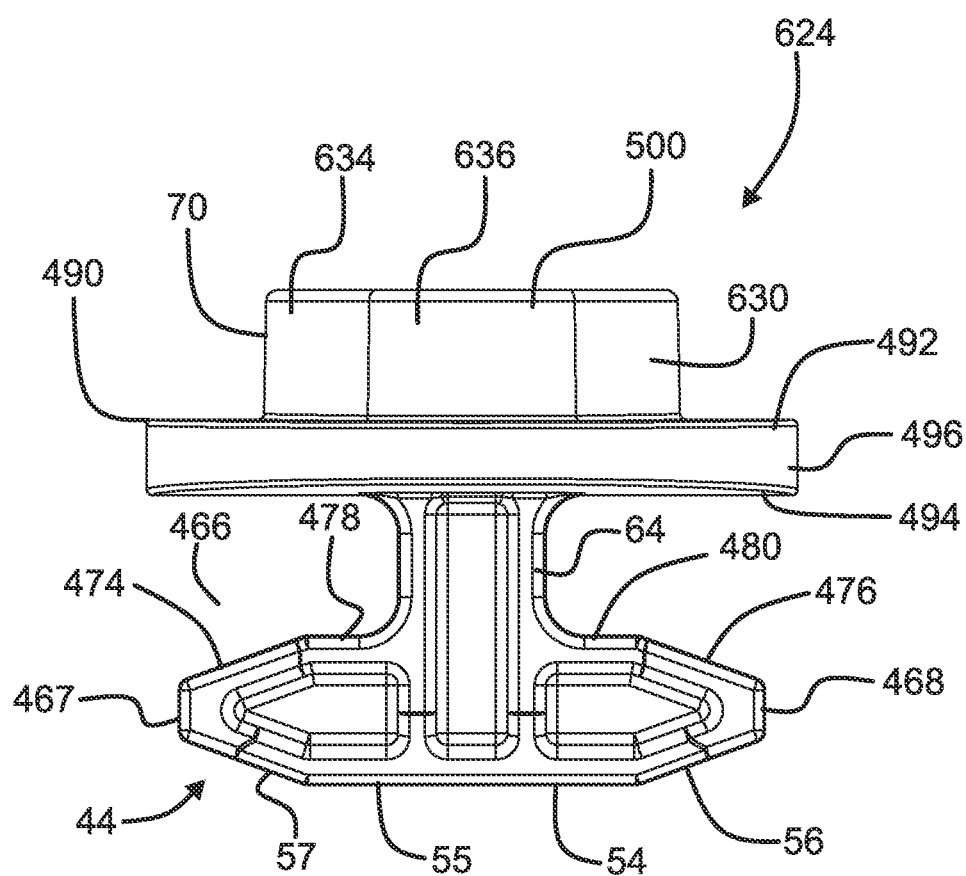
FIG. 31 is a front view of the connection device of FIG. 27 but showing a variation in the insertion member.

FIG. 23 shows the connection device 424 with a central longitudinal axis 482, which generally bisects the connection device 424 through the insertion member 44, shank 64, and handle member 70. Similarly, FIG. 29 shows the connection device 624 with a central longitudinal axis 682, which generally bisects the connection device 624 through the insertion member 44, shank 64, and handle member 70. The connection device 424, 624 is symmetrical about the longitudinal axis 482, 682.

The connection device 424, 624 further includes a washer section 490. The washer section 490 is between the handle member 70 and the insertion member 44. The washer section 490 helps to contain first material in the cellular confinement system 14 and prevent material from first migrating through open slots 36. In addition, the washer section 490 is attractive and eye catching. The washer section 490 can be made to have many different appearances from what is shown, but the one shown is found to be attractive. In the example embodiment shown, the washer section 490 is illustrated as being cylindrical with a diameter perpendicular to the longitudinal axis 482, 682.

The washer section 490 has first surface 492 and an opposite the second surface 494. There is a side surface 496 generally perpendicular to the first surface 492 and the second surface 494 and extending between the first and second surfaces 492, 494. The second surface 496 forms an outer periphery 498. In this example, the outer periphery 498 is in the shape of a circle. The first surface 492 and second surface 494 can be parallel, and generally planar (with variants), in many examples. The first and second surfaces 492, 494 can be perpendicular to the shank 64.

At least a portion of the outer periphery 498 extends from the longitudinal axis 482, 682 radially further than a radial outermost portion of the handle member 70. In many cases, the outermost dimension of the washer section 490 is equal to or greater than an outermost dimension of the handle member 70. In the example shown, the outermost dimension of the washer section 490 is greater than an outermost dimension of the handle member 70.

Extending from the first surface 492 is the handle member 70. In this embodiment, the handle member 70 has a wall 500 extending from the first surface 492 of the washer section 490. The wall 500 can extend generally perpendicular from the first surface 492. In the example shown, the handle member 70 with wall 500 projects from the first surface 492 of the washer section 490 and with no portion of the shank 64 between the first surface 492 and the handle member 70.

The wall 500 can have many different shapes. In the example shown in FIGS. 21-26, the wall 500 is a single upstanding member 512 with a terminal free end 510 opposite from the first surface 492 of the washer member 490. The upstanding member 512 extends between opposite wall side ends 514, 516, which are perpendicular to the first surface 492. The free end 510 extends between the side ends 514, 516.

In the example embodiment shown in FIGS. 21-26, the wall 500 has one or more curved surfaces, while in the embodiment of FIGS. 27-31, the wall 500 can have straight segments (described further below).

Figure 24:
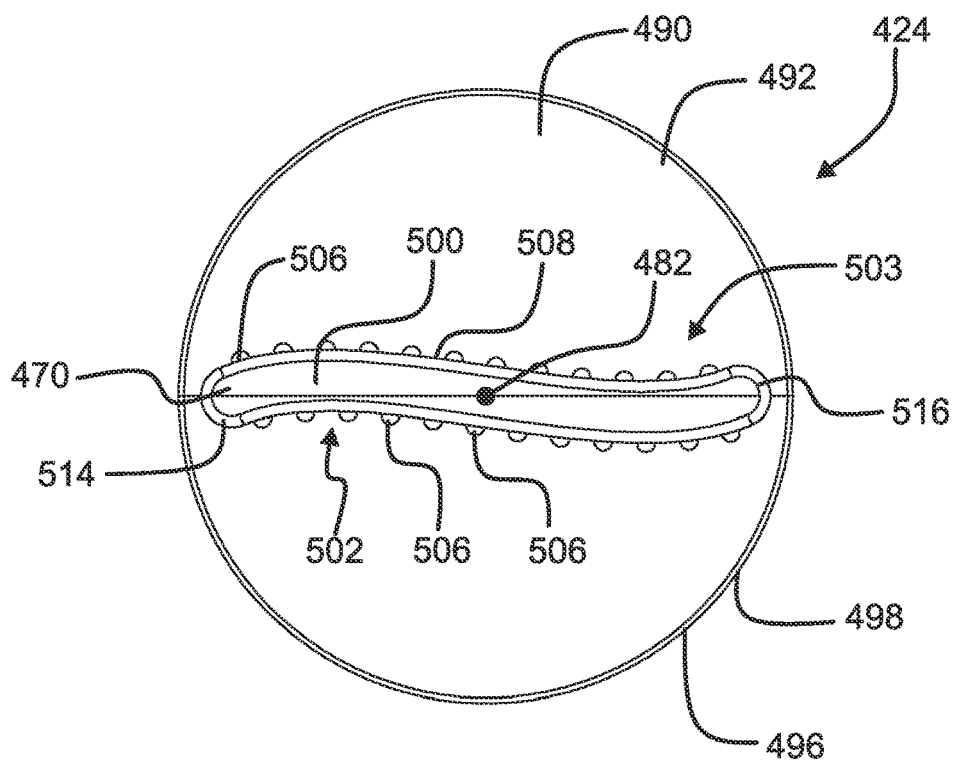
FIG. 24 is a top plan view of the connection device of FIG. 21.
Figure 25:
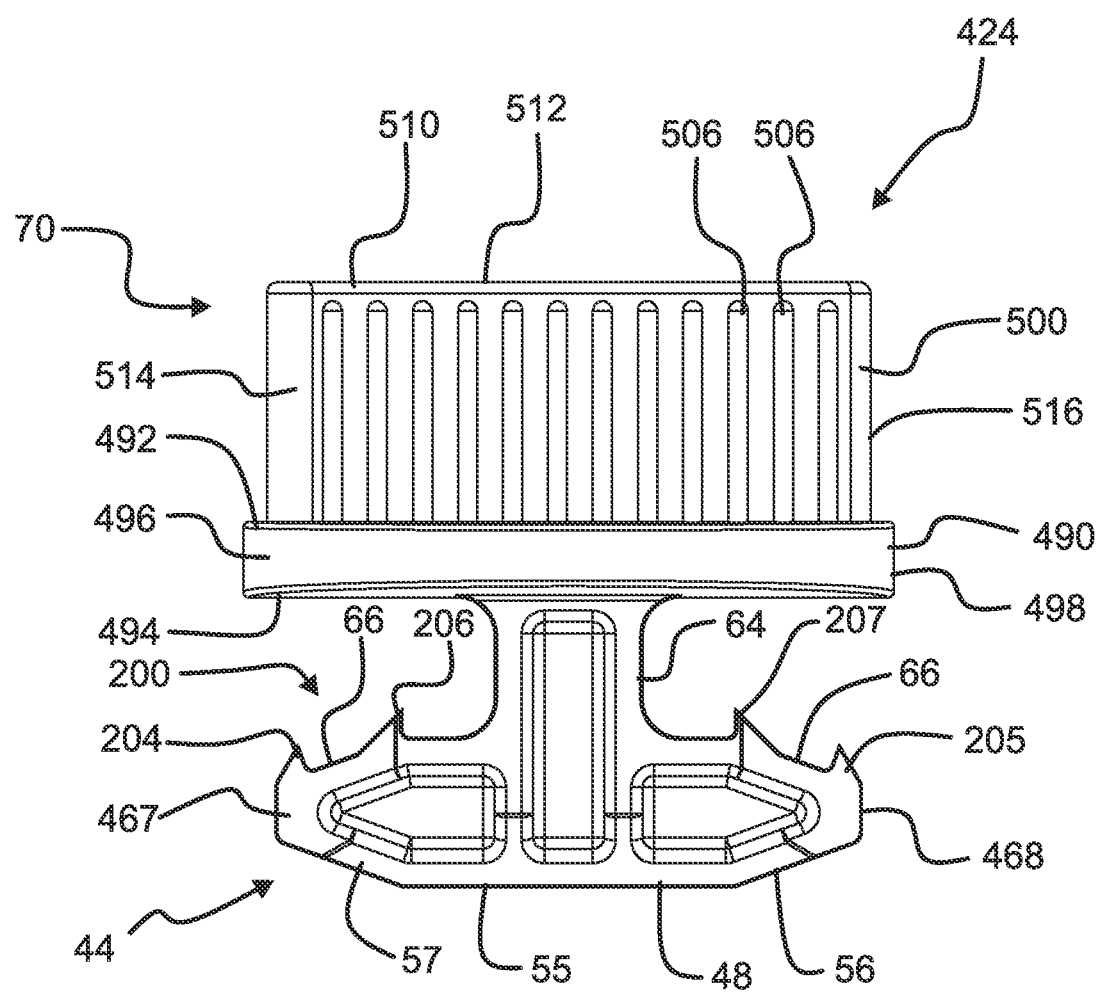
FIG. 25 is a front view of the connection device of FIG. 21, but showing a variation in the insertion member.

In FIG. 24, the wall 500 has curved surface 502 and a curved surface 503. These curved surfaces 502, 503 help to give the wall 500 an S-shape between ends 514, 516. Many variations can be made in the shape of the wall 500. In this example, the radius of curvatures for the curved surfaces 502, 503 are made to allow for convenient grasping and turning by a human hand. In addition, wall 500 is designed to be attractive and eye catching, in that many variations in the appearance are possible. While there can be many variations, the radius of curvatures of the curved surfaces 502, 503 can be in a range of 1.05 to 1.2 inches. For example, when sized within this range, one of the curved surfaces 502, 503 comfortably accommodates most human thumbs, and works especially well during the installation process for use by an installer's right hand.

The handle member 70 in FIGS. 21-26 further includes a plurality of ribs 506 protruding from opposite sides 508, 509 of the wall 500. The ribs 506 extend longitudinally, generally parallel to the longitudinal axis 482. The ribs 506 extend from adjacent a terminal end 510 of the wall 500 to the first surface 492 of the washer section 490. While there can be many variations, in this example, there are between 8-15 ribs (e.g., about 12) 506, spaced from each other, on each side 508, 509 of the wall 500. The ribs 506 help to improve and enhance the grip of a human hand on the handle member 470.

The height of the wall 500 extends from the first surface 492 to the terminal end 510. The height can be many variations, and in this example, can be greater than a length of the shank 64 but less than half the length of the insertion member 44.

In example embodiments, the outermost dimension of the washer section 490 is equal to or greater than an outermost dimension of the handle member 70, in both parallel and perpendicular directions from the center longitudinal axis 482 of the handle 70. In practice, this will ensure complete coverage of the receiving I-slot 36 when the device 424, 624 is inserted and turned between 0 to 90 degrees to make a connection between two adjoining webs 20, 22.

In the embodiment of FIGS. 27-31, the wall 500 has a plurality of connected straight sections 630 having generally flat, planar surfaces enclosing an interior 632. Many variations are possible, and in the example shown, the straight sections 630 form a polygon 634, including a regular polygon. The example polygon 634 shown is a hexagon 636. The straight sections 630 can receive a tool, such as a wrench or an appropriately shaped hex socket, which can be used to rotate the handle member 70.

In the interior 632 of the polygon 634, there can be an additional inset 638 (FIG. 30), recessed from the plane of the first surface 492. The inset 638 can be centered in the interior 632 and have a polygon shape. While variations are possible, in this example, the inset 638 has the same shape as the wall 500. In the example shown, the inset 638 is shaped as a hexagon 640. A tool can be inserted in the inset 638 to rotate the handle 70.

Figure 26:
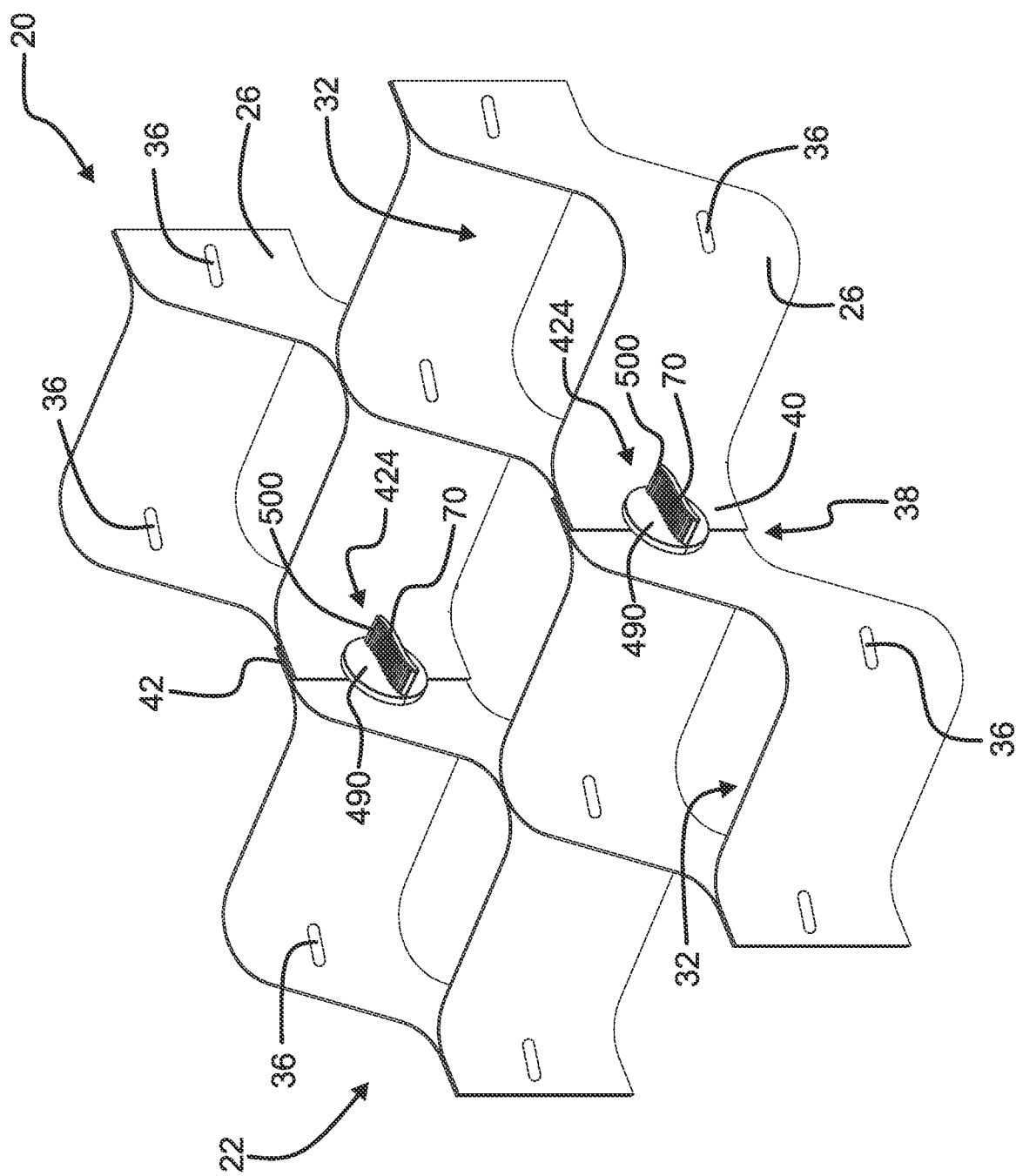
FIG. 26 is a perspective view similar to FIG. 3, but showing the connection device of FIGS. 21-25.
Figure 27:
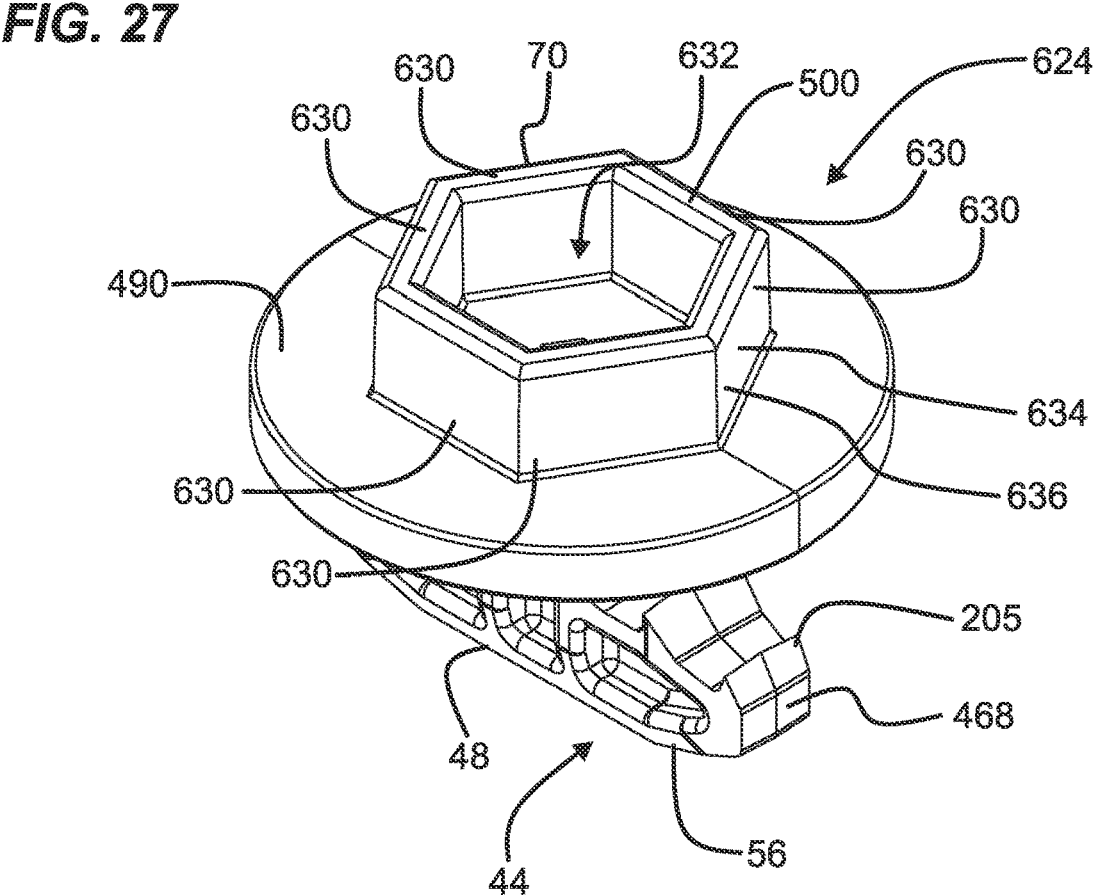
FIG. 27 is a perspective view of another embodiment of a connection device, constructed in accordance with principles of this disclosure.
Figure 28:
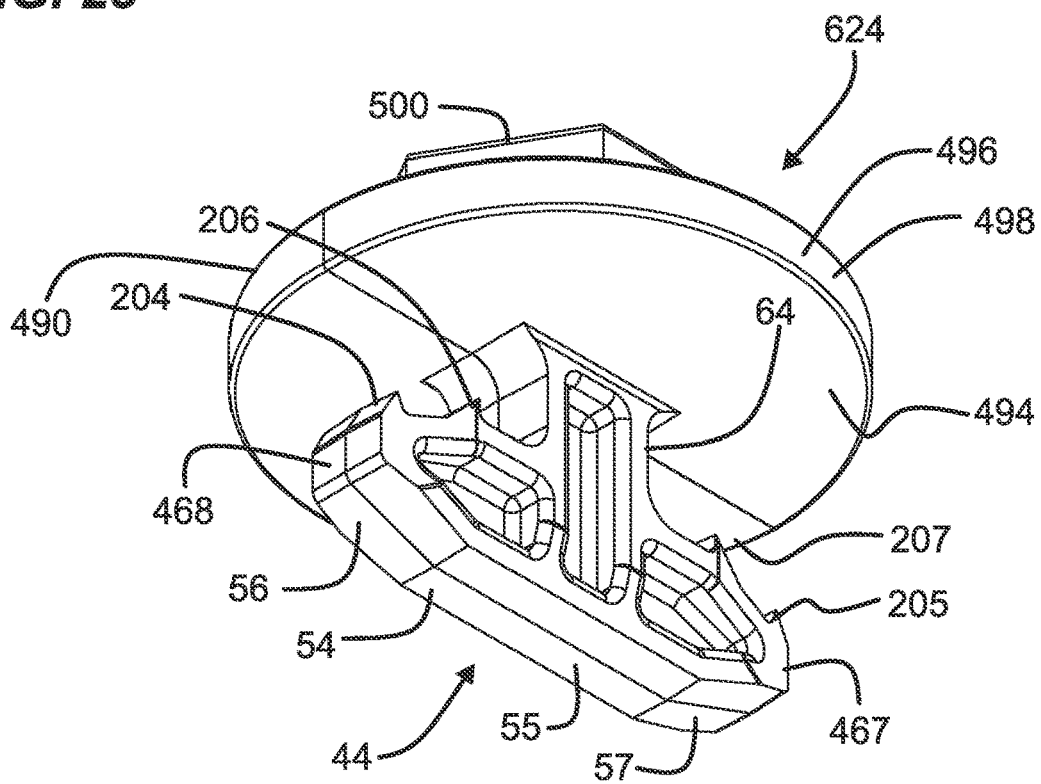
FIG. 28 is a bottom perspective view of the connection device of FIG. 27.

The connection device 424, 624 can be used in the system of FIG. 26, analogous as that described for FIG. 3. As can be appreciated, the washer section 490 is against and covers the open slots 36 on the first side 40 of the cell overlap region 38. This helps to prevent migration of soil or other materials from passing through the slot 36. In some applications, such as use with retaining walls, the connection device 424, 624 having the washer section 490 is only used for the portion of the retaining wall that is externally visible, as it contributes to the attractiveness and beauty of the retaining wall. In those case, the portions that are not visible can use prior art connection devices according to U.S. Pat. No. 8,092,122; or, alternatively, according to FIGS. 4-19.

The connection device 424 can be used in a method of fastening to expanded cellular confinement structures, as described above with respect to connection device 24. In this case, the step of inserting includes pressing the washer section 490 against the first side 40 of the overlap region 38. There is also the step of rotating the handle member 70, in which the handle member 70 includes the wall 500 projecting from the washer section 490. The handle member 70 can also be rotated by using a tool acting on the polygon 634 or on the inset 638.

The connection device 424, 624 can be part of a kit for the system of FIG. 26. The connection device 424, 624 is provided so that the washer section 490 is provided to be placed against and cover the open slots 36 on the first side 40 of the cell overlap region 38.

The connection device 424, 624 can be made from a variety of materials, including non-metal materials such as plastic (HDPE, polypropylene, etc.) The device 424, 624 can be made by molding, such as injection molding.

The above provides a complete description. Many embodiments can be made.

What is claimed is:

1. A cellular confinement system comprising:
   (a) a first unitary web of cells made from elongated plastic strips bonded together in spaced apart areas; the strips forming walls of the cells; at least some of the cells defining open slots;
   (b) a second unitary web of cells made from elongated plastic strips bonded together in spaced apart areas; the strips forming walls of the cells; at least some of the cells defining open slots;
      (i) at least one open slot of the first unitary web of cells being aligned with at least one open slot of the second unitary web of cells to result in a cell overlap region; the cell overlap region having opposite first and second sides; and
   (c) at least one connection device fastening the first unitary web of cells and the second unitary web of cells together; the connection device including:
      (i) an insertion member having first and second opposite insertion ends and an insertion member extension therebetween;
         (A) the insertion member being located on the second side of the cell overlap region;
      (ii) an integral shank extending from the insertion member extension;
         (A) the shank extending through the cell overlap region by extending through both of the aligned one open slot of the first unitary web of cells and the one open slot of the second unitary web of cells;
(iii) an integral handle member extending from the shank at an end of the shank remote from the insertion member;
 (A) the handle member being located the first side of the cell overlap region;
 (B) the insertion member extension having an internal face directed toward the handle member;
(iv) a longitudinal axis extending through each of the insertion member, handle member, and shank; and
(v) a plurality of barbs projecting from only the internal face of the insertion member extension toward the handle member; wherein the plurality of barbs includes at least one barb projecting from the internal face on each of opposite side of the insertion member extension;
wherein the barbs are provided to be placed in direct contact with the second side of the cell overlap region.

2. A cellular confinement system according to claim 1 wherein the at least one connection device includes a plurality of connection devices, each connection device fastening the first unitary web of cells and the second unitary web of cells together.

3. A cellular confinement system according to claim 1 wherein the plurality of barbs includes at least two barbs projecting from the internal face on opposite sides of the insertion member extension.

4. A method of fastening two expanded cellular confinement structures together;
the method comprising:
 (a) aligning two expanded cell confinement structures so that at least one open slot defined by a first unitary web of cells is aligned with at least one open slot defined by a second unitary web of cells to form an overlap region having opposite first and second sides;
 (b) inserting an insertion member of a connection device from the first side of the overlap region through the aligned open slots of the overlap region to provide:
  (i) the insertion member on the second side of the overlap region;
  (ii) a handle member of the connection device on the first side of the overlap region; the insertion member having an internal face directed toward the handle member;
  (iii) a shank between the insert member and the handle member extending through the overlap region; and
  (iv) a plurality of barbs projecting from only the internal face of the insertion member toward the handle member; wherein the plurality of barbs includes at least one barb projecting from the internal face on each opposite side of the insertion member; and
 (c) rotating the handle member to rotate the connection device within the overlap region.

5. A method of fastening according to claim 4 wherein the step of rotating includes rotating the handle member approximately 90°.

6. A kit comprising:
(a) a plurality of unitary webs of cells made from elongated plastic strips bonded together in spaced apart areas; the strips forming walls of the cells; at least some of the cells defining open slots that are alignable with open slots of adjacently positioned unitary webs of cells at cell overlap regions, the cell overlap regions having opposite first sides and second sides; and (b) a plurality of connection devices usable to fasten together adjacently positioned unitary webs of cells through the slots at the cell overlap regions; each of the connection devices including:
 (i) an insertion member having first and second opposite insertion ends and an insertion member extension therebetween; the insertion member being positionable on the second side of the cell overlap region;
 (ii) an integral shank extending generally perpendicular from the insertion member extension and being spaced from each of the first and second insertion ends;
  (A) the shank being positionable through the cell overlap region by extending through aligned slots;
 (iii) an integral handle member extending generally perpendicular from the shank at an end of the shank remote from the insertion member;
  (A) the handle member being positionable on the first side of the cell overlap region;
  (B) the insertion member extension having an internal face directed toward the handle member;
 (iv) a longitudinal axis extending through each of the insertion member, handle member, and shank; and
 (v) a plurality of barbs projecting from only the internal face of the insertion member extension toward the handle member; wherein the plurality of barbs includes at least one barb projecting from the internal face on each of opposite side of the insertion member extension;
wherein the barbs are provided to be placed in direct contact with the second side of the cell overlap region.

7. The kit of claim 6 wherein each of the connection devices includes the plurality of barbs having at least two barbs projecting from the internal face on opposite sides of the insertion member extension.

8. A connection device for fastening two expanded cellular confinement structures; the connection device comprising:
(a) an insertion member having first and second opposite insertion ends and an insertion member extension therebetween;
(b) an integral shank extending generally perpendicular from the insertion member extension and being spaced from each of the first and second insertion ends;
(c) an integral handle member extending from the shank at an end of the shank remote from the insertion member; wherein the insertion member extension includes,
 (i) an external face facing away from a remaining portion of the connection device;
 (ii) an internal face facing toward the handle member;
  (A) the first and second insertion ends joining the external face and internal face;
  (B) the first insertion end having a planar first end face;
  (C) the second insertion end having a planar second end face;
  (D) the external face including a first angled section; a second angled section; and a straight mid-section extending between the first angled section and second angled section;
  (E) the first angled section extending from the first insertion end to the mid-section at a non-zero angle;
  (F) the second angled section extending from the second insertion end to the mid-section at a non-zero angle; and (d) a plurality of barbs projecting from only the internal face of the insertion member extension toward the handle member; wherein the plurality of barbs includes at least one barb projecting from the internal face on each of the opposite sides of the insertion member extension.

9. A connection device according to claim 8 wherein:
(a) the connection device has a longitudinal axis bisecting the device extending through each of the insertion member, handle member, and shank; and
(b) each barb has at least one beveled surface ending with an end point; wherein each beveled surface extends along a plane that intersects the longitudinal axis at: the shank, the handle member, or in space above the handle member and away from the insertion member, when the connection device is oriented with the handle member upright and the insertion member lowermost.

10. A connection device according to claim 8 wherein the handle member, insertion member, and shank are a solid piece.

11. A connection device according to claim 8 wherein:
(a) the handle member has first and second handle ends and a handle member extension therebetween; the shank being spaced from each of the first and second handle ends; and
(b) the handle member extension includes first and second rounded ears projecting therefrom.

12. A connection device according to claim 8 wherein the first and second ears are projecting away from the insertion member at the first and second handle ends, and the handle member extension is straight between the first and second ears.

* * * * *